(12) United States Patent
Woodall

(10) Patent No.: US 6,801,655 B2
(45) Date of Patent: Oct. 5, 2004

(54) SPATIAL IMAGE PROCESSOR

(75) Inventor: Roger L. Woodall, Jewett City, CT (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 719 days.

(21) Appl. No.: 09/853,932

(22) Filed: May 10, 2001

(65) Prior Publication Data

US 2002/0168100 A1 Nov. 14, 2002

(51) Int. Cl.[7] .................................................. G06K 9/62
(52) U.S. Cl. ...................... 382/156; 382/305; 701/59; 704/232; 706/15; 706/42
(58) Field of Search ................................. 382/155–161, 382/305; 704/232, 259; 701/40, 59; 706/15–44

(56) References Cited

U.S. PATENT DOCUMENTS

| | | | | |
|---|---|---|---|---|
| 5,263,122 A | * | 11/1993 | Nunally ....................... | 706/642 |
| 6,028,608 A | * | 2/2000 | Jenkins ....................... | 345/619 |
| 6,278,799 B1 | * | 8/2001 | Hoffman ....................... | 382/159 |
| 6,429,812 B1 | * | 8/2002 | Hoffberg ..................... | 342/357.1 |

* cited by examiner

Primary Examiner—Bhavesh M. Mehta
Assistant Examiner—Sheela Chawan
(74) Attorney, Agent, or Firm—James M. Kasischke; Michael F. Oglo; Jean-Paul A. Nasser

(57) ABSTRACT

A spatial image processor neural network for processing image data to discriminate between first and second spatial configurations of component objects includes a photo transducer input array for converting an input image to pixel data and sending the data to a localized gain network (LGN) module, a parallel memory processor and neuron array for receiving the pixel data and processing the pixel data into component recognition vectors and chaotic oscillators for receiving the recognition vectors and sending feedback data to the LGN module as attention activations. The network further includes a temporal spatial retina for receiving both the pixel data and temporal feedback activations and generating temporal spatial vectors, which are processed by a temporal parallel processor into temporal component recognition vectors. A spatial recognition vector array receives the temporal component recognition vectors and forms an object representation of the first configuration of component objects.

17 Claims, 29 Drawing Sheets

OLD CAR

PILE OF OLD JUNK

AN OLD CAR IMAGE SEPARATED BY A TREE

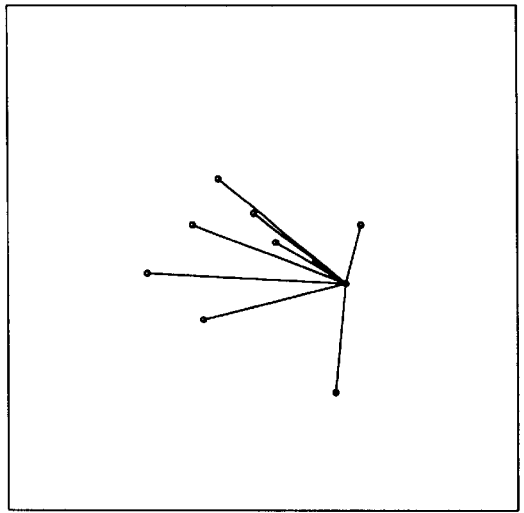
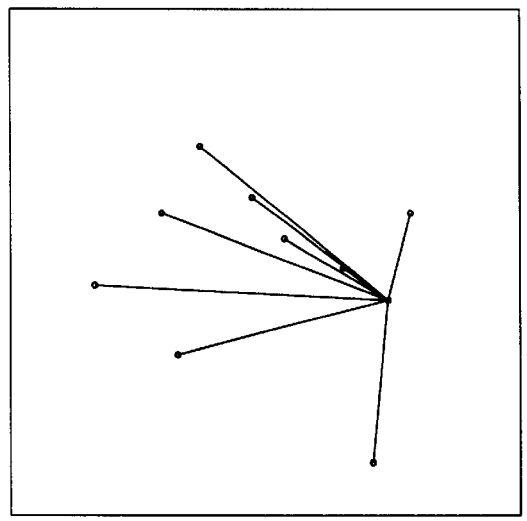
FIG. 15

POSITIONAL KING OF MOUNTAIN (PKOM) WITH THRESHOLD CIRCUIT

SPATIAL IMAGE PROCESSOR

STATEMENT OF GOVERNMENT INTEREST

The invention described herein may be manufactured and used by and for the Government of the United States of America for governmental purposes without the payment of royalties thereon or therefore.

BACKGROUND OF THE INVENTION (1) Field of the Invention

The invention relates to neural networks and is directed more particularly to a spatial image processor neural network for processing spatial image data to distinguish one configuration of component objects from a different configuration of the same component objects.

(2) Description of the Prior Art

Electronic neural networks have been developed to rapidly identify patterns in certain types of input data, or to classify accurately the input patterns into one of a plurality of predetermined classifications. For example, neural networks have been developed which can recognize and identify patterns, such as the identification of hand-written alphanumeric characters, in response to input data constituting the pattern of on/off picture elements, or "pixels," representing the images of the characters to be identified. In such a neural network, the pixel pattern is represented by, for example, electrical signals coupled to a plurality of input terminals, which, in turn, are connected to a number of processing nodes, each of which is associated with one of the alphanumeric characters which the neural network can identify. The input signals from the input terminals are coupled to the processing nodes through certain weighting functions, and each processing node generates an output signal which represents a value that is a non-linear function of the pattern of weighted input signals applied thereto. Based on the values of the weighted pattern of input signals from the input terminals, if the input signals represent a character, which can be identified by the neural network, one of the processing nodes, which is associated with that character will generate a positive output signal, and the others will not. On the other hand, if the input signals do not represent a character, which can be identified by the neural network, none of the processing nodes will generate a positive output signal. Neural networks have been developed which can perform similar pattern recognition in a number of diverse areas.

The particular patterns that the neural network can identify depend on the weighting functions and the particular connections of the input terminals to the processing nodes. As an example, the weighting functions in the above-described character recognition neural network essentially will represent the pixel patterns that define each particular character. Typically, each processing node will perform a summation operation in connection with values representing the weighted input signals provided thereto, to generate a sum that represents the likelihood that the character to be identified is the character associated with that processing node. The processing node then applies the nonlinear function to that sum to generate a positive output signal if the sum is, for example, above a predetermined threshold value. Conventional nonlinear functions which processing nodes may use in connection with the sum of weighted input signals generally include a step function, a threshold function, or a sigmoid. In all cases the output signal from the processing node will approach the same positive output signal asymptotically.

Before a neural network can be useful, the weighting functions for each of the respective input signals must be established. In some cases, the weighting functions can be established a priori. Normally, however, a neural network goes through a training phase in which input signals representing a number of training patterns for the types of items to be classified (e.g., the pixel patterns of the various hand-written characters in the character-recognition example) are applied to the input terminals, and the output signals from the processing nodes are tested. Based on the pattern of output signals from the processing nodes for each training example, the weighting functions are adjusted over a number of trials. After being trained, the neural network can generally accurately recognize patterns during an operational phase, with the degree of success based in part on the number of training patterns applied to the neural network during the training stage, and the degree of dissimilarity between patterns to be identified. Such a neural network can also typically identify patterns that are similar, but not necessarily identical, to the training patterns.

One of the problems with conventional neural network architectures as described above is that the training methodology, generally known as the "back-propagation" method, is often extremely slow in a number of important applications. In addition, under the back-propagation method, the neural network may result in erroneous results, which may require restarting of training. Even after a neural network has been through a training phase confidence that the best training has been accomplished may sometimes be poor. If a new classification is to be added to a trained neural network, the complete neural network must be retrained. In addition, the weighting functions generated during the training phase often cannot be interpreted in ways that readily provide understanding of what they particularly represent.

Thus, a neural network is typically considered to be a trainable entity that can be taught to transform information for a purpose. Neural networks are adaptable through a form of training, which is usually by example. Long training times is a problem in trainable neural networks.

The spatial image processor is part of a new neural network technology that is constructed rather than trained as in common neural networks. Since the words "neural network" often connote a totally trainable neural network, the full definition of a constructed neural network, as used herein, is as follows: A constructed neural network is a connectionist neural network system that is assembled using common neural network components to perform a specific process. The assembly is analogous to the construction of an electronic assembly using resistors, transistors, integrated circuits and other simple electronic parts. Some examples of common neural components are specific values and/or types of connections, processing elements (neurons), output functions, gain elements and other artificial neural network parts. As in electronics, the laws of nature, such as mathematics, physics, chemistry, mechanics, and "Rules of Experience" govern the assembly and architecture of a constructed neural network. A constructed neural network, which is assembled for a specific process without the necessity of training, can be considered equivalent to a trained common neural network with an infinite training sequence that has attained an output error of zero. Most neural network systems of many constructed neural network modules, such as the spatial objects data fuser, have weights that are never altered after they are constructed. When the traditional neural network system is trained, learning occurs only in special memory modules. Such special memory modules are part of this new constructed neural network technology that learns an example in a single application and does not require a retraining of the old examples when a new example is added to a previously trained system, i.e., old memory is retained and not altered.

In artificial neural networks various neural components have synonyms. For example a "neuron", a "processing element" and a "processing node" are the same. A "connection value", a "weight value" and "weighting value" are the same. One or more of such synonyms are used in this and or other associated applications.

Despite advances in spatial image processors, there remains a need for a spatial image processor neural network wherein the spatial image processor neural network has a very high neuron count (approximately $10^5$ to $10^8$ neurons), depending on the multidimensional space the neural network modules operate, and is of an architectural structure providing unique attributes:

(1) The spatial image processor discriminates between two groups comprised of identical components in two different spatial configurations. It is noted that most all image recognition systems cannot discriminate between two such groups.
(2) The spatial image processor increases its sensitivity or attention to an object of interest in a field of more than one object.
(3) The spatial image processor increases its sensitivity to an object of interest in a field where one or more other objects are of non-interest.
(4) The spatial image processor recognizes a partially hidden object when the object is incomplete or is bisected by one or more other objects.
(5) The spatial image processor recognizes one or more objects in a field of many different objects.
(6) The spatial image processor interfaces with an external neural network or system (not described herein) that uninhibits an object that becomes the spatial image processor's "choice" of object to be fully recognized and to be attentive of the object when such an object is in or enters the visual field.
(7) The spatial image processor has a prototype output that represents the general class of a recognized object regardless of the status of the external system activations.
(8) The spatial image processor contains a low level of processing outputs that represent peripheral vision recognition outputs. Each of the processed outputs provides an activation for a component object image in any position on the retina.
(9) The spatial image processor recognizes various sizes of the same object. An object, subtending varying size virtual images in the image field, as it is viewed from near to far, is continuously recognized as the same object.
(10) A first embodiment of a spatial image processor "retina" contains a connection set that gives it a natural image position invariant processing retina.
(11) A second embodiment of a spatial image processor "retina" contains a connection set that gives it a natural processing fovea. The foveating (foveal vision) retina contains a "natural sweet spot of recognition" without an architecture of geometric division to provide this process. It is noted that the general definition of a foveating retina, or foveal vision, has two defining human characteristics. One is that an image seen in bright light is sensed in color as the fovea contains mostly cones. The second is that the fovea contains an area of the eye having a high concentration of photonic elements to produce recognitions with fine detail in contrast to the course detail of peripheral vision. The spatial image processor uses a high resolution monochrome photo transducer through out the retina.
(12) The spatial image processor senses a spatial arrangement of component objects to process a temporal signal containing the spatial data.
(13) The spatial image processor has a high memory efficiency as it can use a component object in more than one high level object of recognition.
(14) The spatial image processor uses linear neurons in most all neural network processings.
(15) The spatial image processor architecture is designed and operates under one or more technologies such as constructed neural network, concurrent multiple frequency band and synchronous nonlinear dynamical (chaos) technologies.

SUMMARY OF THE INVENTION

It is, then, an object of the invention to provide a spatial image processor neural network having the desired attributes noted herein immediately above.

With the above and other objects in view, as will hereinafter appear, a feature of the present invention is the provision of a spatial image processor neural network for processing image data to discriminate a first spatial configuration of component objects from a second configuration of identical component objects, the network comprising: a photo transducer input array for converting a virtual image to pixel data and sending a signal indicative of said pixel data; a localized gain network (LGN) module for receiving the signal indicative of the pixel data, wherein each input pixel drives a corresponding neuron, and increasing the gain of individual neurons as a function of attention activations; and a retina array and parallel memory processor for receiving the pixel data from the LGN module, for processing the pixel data into memory vectors and for generating a signal including attention activators for the localized gain network module and synchronous temporal activations. The network further comprises neuron arrays, component recognition vectors and chaotic oscillators (nonlinear dynamical oscillators) assembly for receiving the memory vectors, for receiving associative connection feedback and for sending feedback data to the retina array and parallel memory processor. Each of the component recognition vectors is operable to activate a chaotic oscillator, with each of the chaotic oscillators being different each to represent one of the component objects. The component recognition vectors further send peripheral vision object activations. The network also includes a temporal spatial retina for receiving the pixel data from the localized gain network module and the temporal activations from the component recognition vector assembly and parallel memory processor, for generating temporal spatial data and for sending temporal spatial vectors. Also, a temporal parallel memory processor receives the temporal spatial vectors from the temporal spatial retina and sends temporal component memory vectors. The network still further comprises a temporal, spatial and object recognition vector array for receiving the temporal component memory vector from the temporal retina array and parallel memory processor and external associative connections, for forming an object representation of the first configuration of component objects, for sending prototype object activations and for sending the associative connection feedback to the neuron array, component recognition vectors, and to synchronize chaotic oscillator assemblies, which in turn further increases the attentive signal for feedback to the LGN and temporal spatial retina.

The above and other features of the invention, including various novel details of construction and combinations of parts, will now be more particularly described with reference to the accompanying drawings and pointed out in the claims. It will be understood that the particular network arrangement embodying the invention is shown by way of illustration only and not as a limitation of the invention. The principles and features of this invention may be employed in various and numerous embodiments without departing from the scope of the invention.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein like reference numerals refer to like parts and wherein:

FIGS. 11 and 11A are diagrammatic representations of an arrangement and function of a chaotic oscillators portion of the component recognition vectors assembly of FIG. 1;

FIGS. 15–19 are diagrammatic representations of neuron connection sets and temporal activations for the exemplar image of FIG. 13;

DESCRIPTION OF THE PREFERRED EMBODIMENTS

Figure 1:
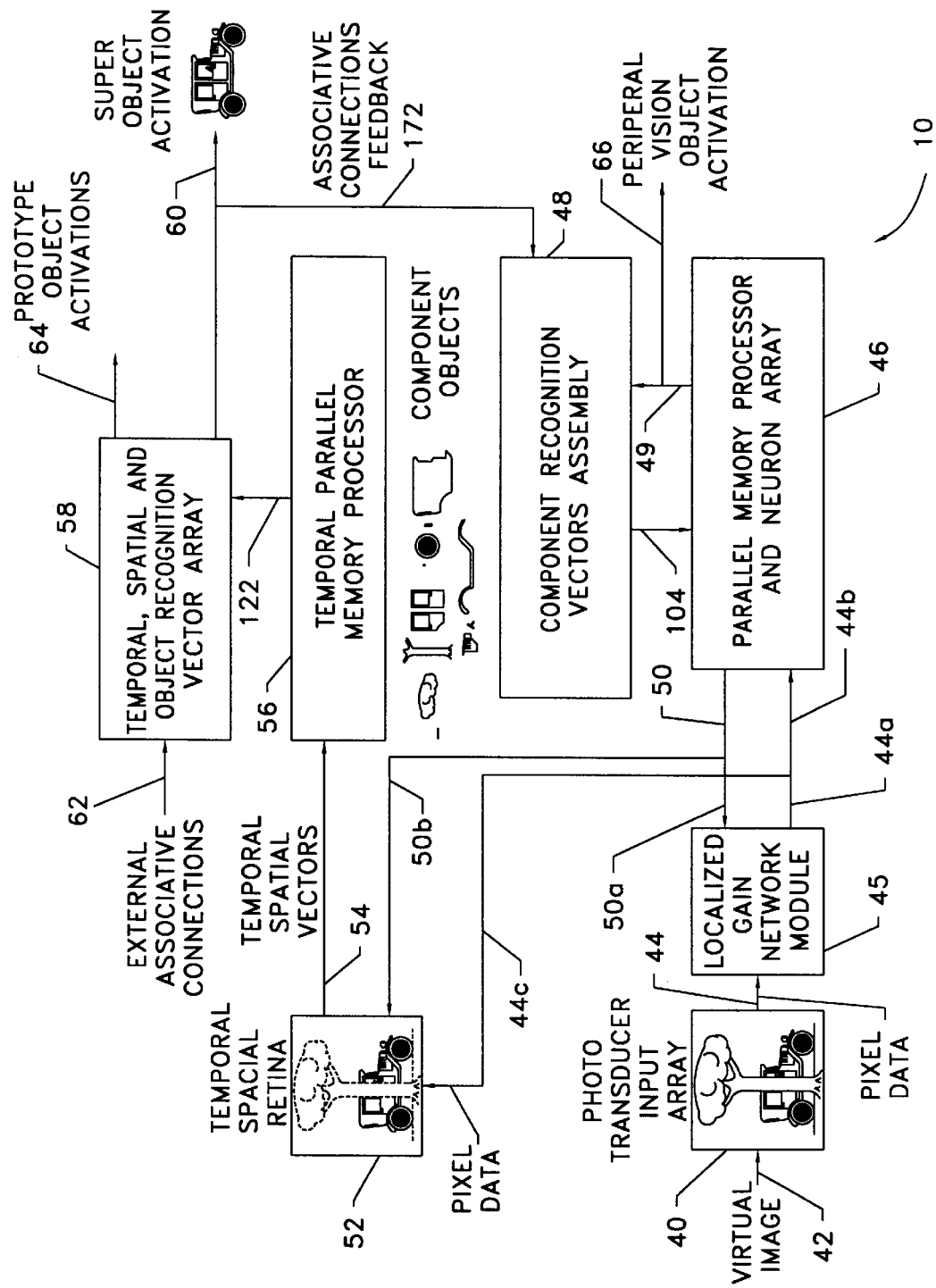
FIG. 1 is a block diagram of one form of a spatial image processor neural network illustrative of an embodiment of the invention.

Referring to FIG. 1, there is shown the overall architecture for the preferred embodiment of spatial image processor 10. It will be seen that a photo transducer input array 40 converts a virtual image 42 to an array of scaler data, which is called "pixel data" 44. The pixel data 44 initially passes through a localized gain network (LGN) module 45 without change, the unchanged output of LGN 45 referred to as pixel data 44a. Pixel data 44a is forwarded (referred to as pixel data 44b) to a parallel memory processor and neuron array 46, which processes the pixel data into component recognition vectors 49.

More specifically, the component recognition vectors 49 are the result of sparse neural activations that represent a specific virtual image on the input array 40. The appropriate component recognition vectors 49 activate all component objects that are recognized in a neuron array and component recognition vectors assembly 48. For each recognized object activation, a periodic broadband impulse 104 is fed back toward one or more relative pixel positions in the signal path that provided the gradient data for the component recognition vector 49. A feedback signal 50 goes to LGN module 45 and to a temporal spatial retina 52, referred to as 50a and 50b, respectively. In the LGN 45 module, the feedback signal 50a partially increases the neuron gain to increase the sensitivity, or attention, of spatial image processor 10 for each component object it recognizes. That is, the feedback signal 50 serves as attention activations 50a. The temporal spatial retina 52 also receives the same feedback signal, referred to as temporal activations 50b. LGN 45 pixel data 44a is also provided to temporal spatial retina 52, referred to as pixel data 44c. The impulse signals merge with LGN 45 pixel data 44c in the temporal spatial retina 52 as temporal component objects, each with unique identifying temporal activations. Each temporal component activation occurs at a different time to represent the position and identification of a specific component object relative to other component objects. The virtual spatial retina 52 merges the sequential temporal activations 50b in their relative positions to each other to generate sequences of pulses containing amplitude information representing a spatial configuration of component objects making up a super object 60, i.e., the object of interest in the scene. This temporal spatial retina output data 54 is processed in a temporal parallel memory processor 56 into temporal component recognition vectors 122 in a similar manner as described for processor 46. The component recognition vectors 122 in turn are processed into component activations. Each component activation contains information on its relative spatial configuration relative to all components that make up the overall super object 60, and the activations are recognized in a spatial recognition vector array 58. The overall super object 60 has associative connections 172 to each of the component objects that it consists of, which are fed into assembly 48 as associative connections feedback 172. The associative connections feedback 172 are processed within assembly 48 to enhance the broadband impulse 104. The activation of these connections by the recognition of the overall super object increases the amplitude of the temporal activations only for the associative component objects. The feedback signal attention activation 50a in the LGN module 45 increases the attention gain to a higher level for the specific component objects, thereby the overall object becomes an attentive object representation 60.

Figure 4:
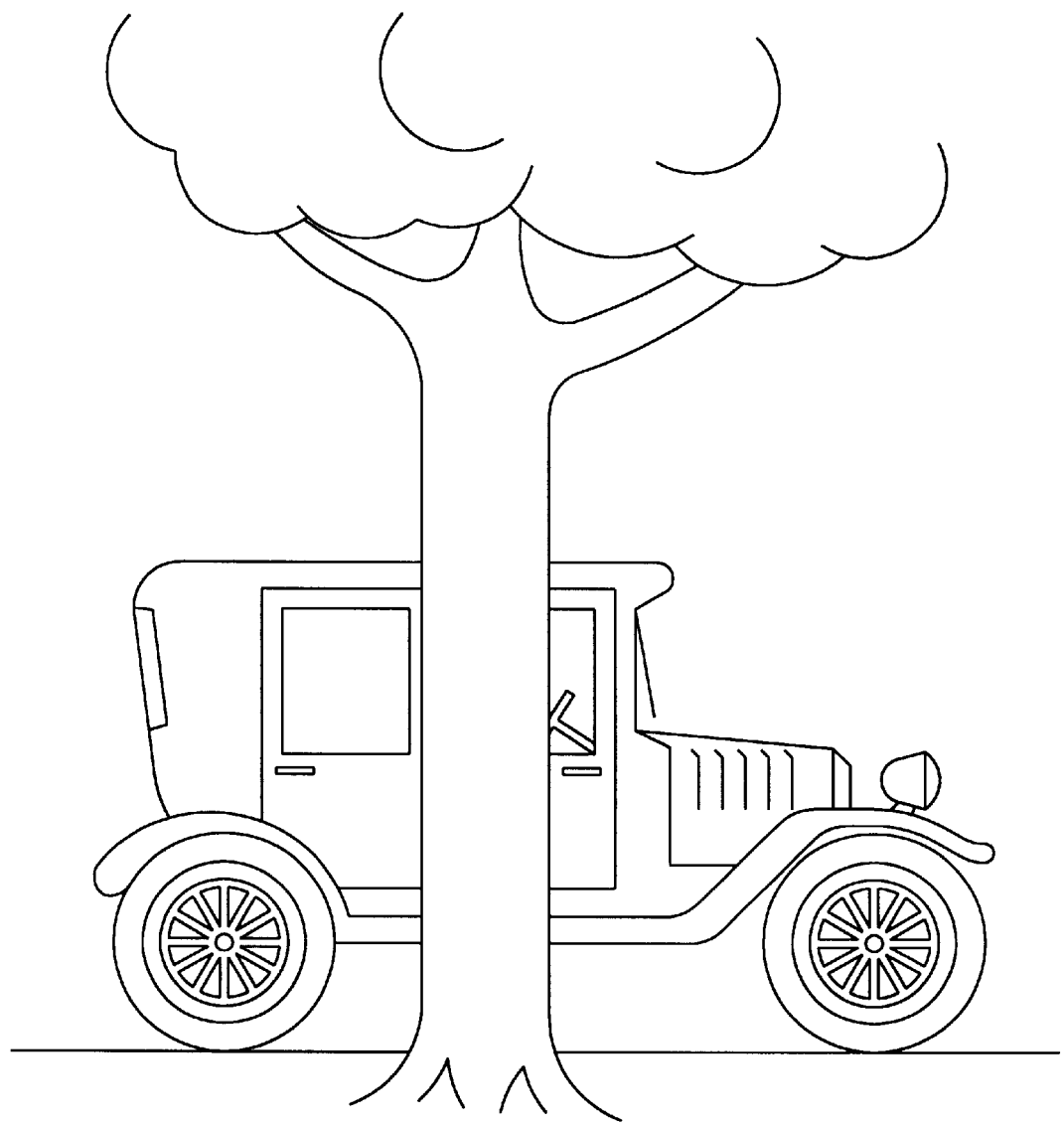
FIG. 4 is a side elevational view of the car of FIG. 2, but in part obstructed from view.

The spatial image processor 10 can shift its attention under external control through a set of external associative connections 62. Consider the following three scenarios reflecting external associative connections 62 where one of three different active conditions, such as "tired of walking", "hungry", or "thirsty" exist and the spatial image processor 10 is viewing the scene in FIG. 4. There are at least two, and perhaps many, external associative connections 62 that can effect the spatial image processor 10 relative to the specific input scene. One is between the tired mode and the old car recognition neural circuit (as the car represents a possible ride) and the other is the hungry mode and the tree object recognition neural circuit (the tree is a possible source of fruits or nuts). Either recognition neural circuit is enabled by the tired or hungry activation output to allow it to become fully attentive through feedback. The tired mode causes the spatial image processor 10 to attentively recognize the old car, as described in the paragraph above. If the mode is shifted to hunger, the feedback to the car component objects becomes inhibited and the tree object components become enabled. In the thirsty mode, there are no attention object representations 60 for objects in the given image, as the scene contains nothing of interest. Thus, there are no full attention activations. Under this mode, all previous trained recognizable component objects have an initial low-level attention activation. An initial low-level attention allows the spatial image processor 10 to quickly change its mode to full attention for objects it knows and to ignore irrelevant visual information when enabled by the external associative connections 62. Also, the spatial image processor 10 will still have prototype object activations 64 for all correct spatially configured objects in the image data.

The spatial image processor 10 recognizes a partially hidden object because the relative spatial configuration information is encoded in each component that makes up the visualized object 60 and is recognized in the spatial recognition vector array 58. In a divided or partially exposed object, all of the recognizable and visible components maintain the correct spatial configurations that will allow super object 60 recognition.

Figure 5:
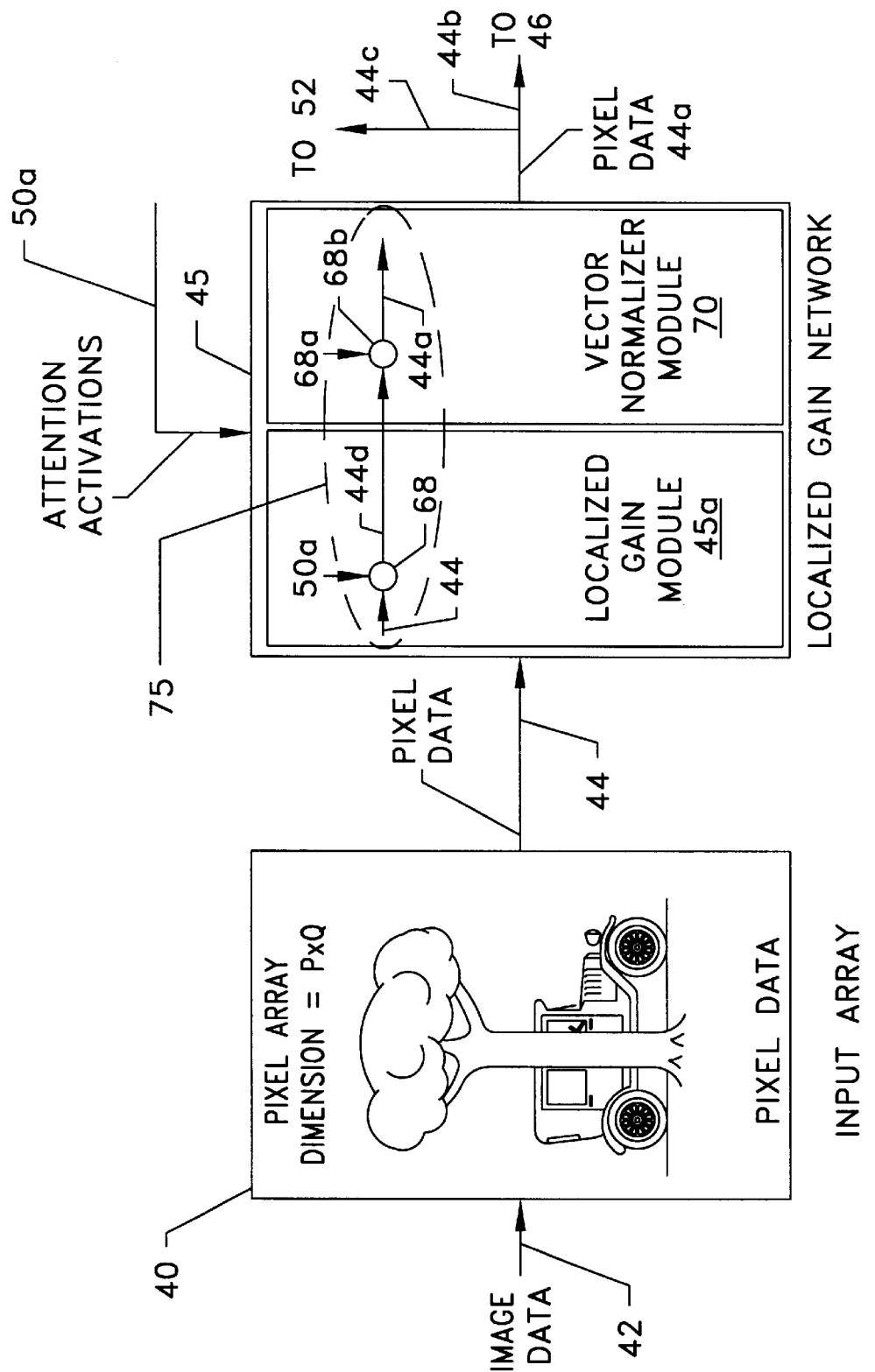
FIG. 5 is an enlarged block diagram showing input array and localized gain network portions of the network of FIG. 1, with a portion thereof shown diagrammatically broken out and enlarged.

Referring to FIGS. 1 and 5, it will be seen that the spatial image processor 10 receives image data into the photo transducer input array 40 to become pixel data. Input array 40 converts image data to scalar values of pixel datum relative to the image intensities. The pixel array has the dimensions of P by Q, or "s" pixel count. The scalar values of pixel data are connected to the localized gain network (LGN) 45 of the same spatial dimensions. The LGN 45 is named after the biological neural group called the lateral geniculate nucleus of the thalamus that modulates the optical pathway between the eye and the visual cortex. LGN 45 and the biological system are both associated with attention. The localized gain module 45a of LGN 45 increases the gain of individual neurons as a function of attention activations 50a. The minimum neuron gain is one and it increases its gain with the average energy of attention activations 50a. Each input pixel has a corresponding neuron 68 within localized gain module 45a (FIG. 5). The spatial relationship of the pixel array is preserved through LGN 45 and in many of the modules in this invention, which is very important to its processing ability. The output stage of LGN 45 is a neural module called a vector normalizer 70 (FIG. 5). The vector normalizer 70 adjusts the array of scalar data 44d from localized gain module 45a into a normalized vector, or unit vector 44a of the image pixel data via normalization activation 68a to neuron 68b. Each neuron 68 has a corresponding neuron 68b within normalizer 70 as shown by circuit 75.

The array of scalars 44d is the output of all localized gain module linear neurons 68, thus array 44d has a spatial dimension equal to the photo transducer input array 40, as each neuron 68 corresponds to one of the "s" pixels. Thus, there are "s" neural circuits 75 in LGN 45. This neural architecture, wherein each pixel corresponds to a neural circuit, is represented throughout the neural circuits of the spatial image processor 10, as will be discussed further herein. The architecture allows an image in any position on a retina to generate a signal flow from a spatial P×Q organization to one or more image components in their fixed neural positions in the spatial image processor 10 architecture and then allows a feedback signal to return back to the same retinal position in the temporal spatial retina 52.

Therefore, when the attention activations 50a occur, they cause the contrast of the non-attentive pixel data to decrease relative to the enhanced attentive pixel data. The vector of LGN 45 is processed by both the parallel memory processor 46, where it is referred to as vector 44b, and by temporal parallel memory processor 56, where it is referred to as vector 44c.

The four modules, i.e., the parallel memory processor and neuron array 46, the component recognition vectors assembly 48, the temporal parallel memory processor 56, and the spatial recognition vector array 58, are described in U.S. Pat. No. 5,446,828, incorporated herein by reference, and U.S. patent application Ser. No. 09/641,395. However, each of the modules as described therein is modified by the removal and/or addition of other constructed neural network parts, modules and feedback paths added to the architecture to obtain the architecture of the spatial image processor herein.

Figure 6:
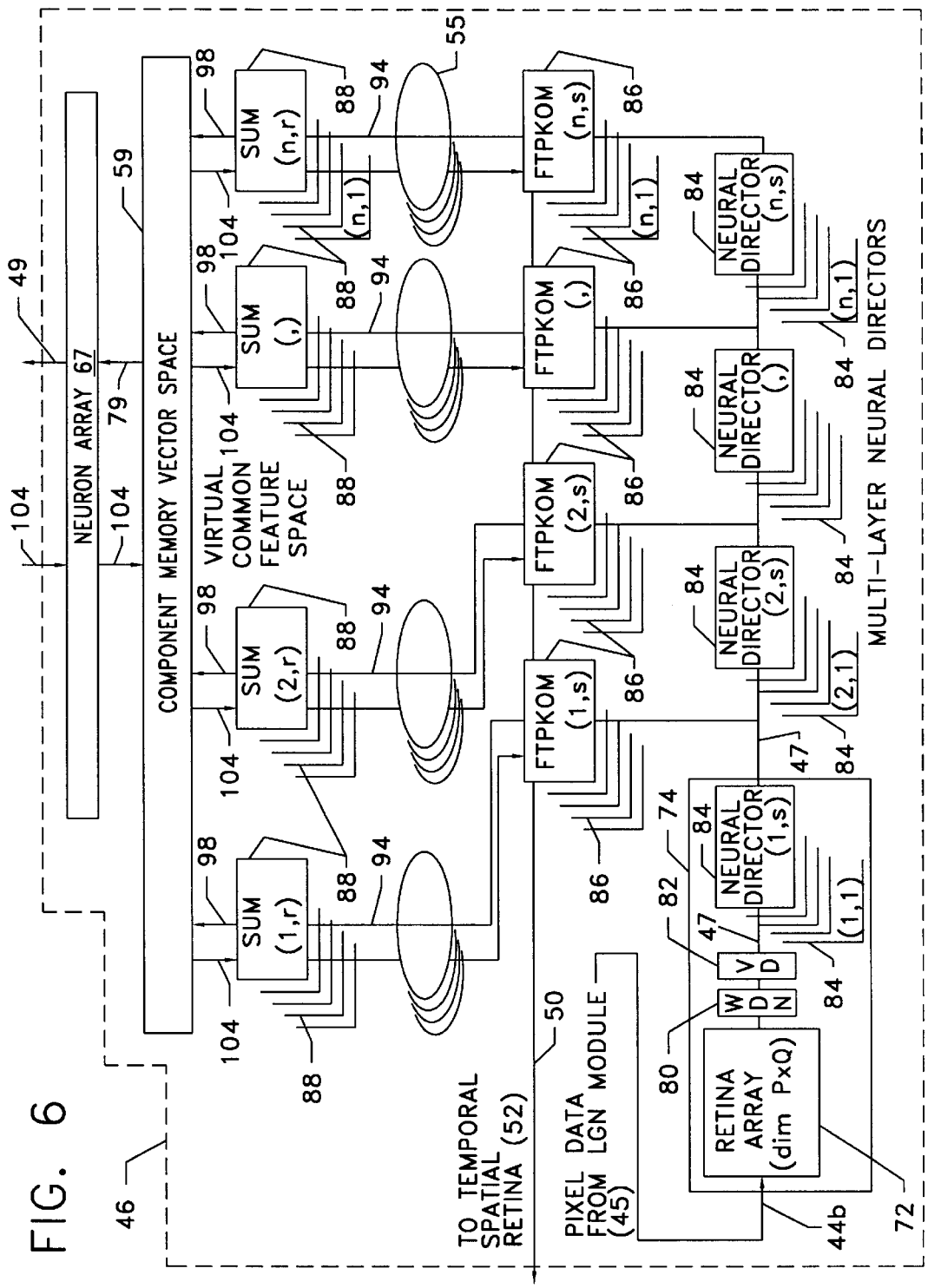
FIG. 6 is a block diagram illustrating internal portions and functions of a parallel memory processor and neuron array of FIG. 1.
Figure 10:
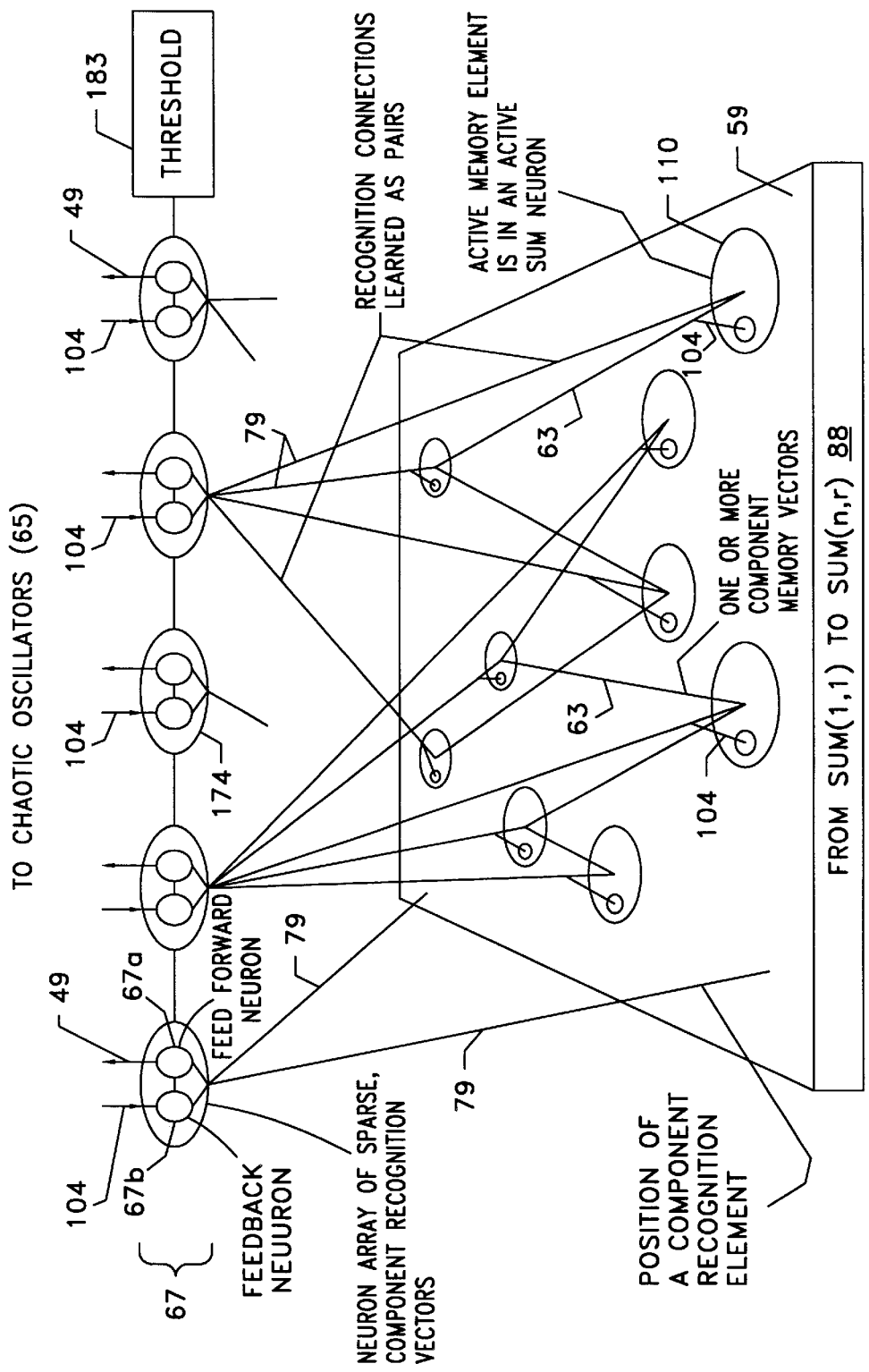
FIG. 10 is a diagrammatic representation of an arrangement and functions of portions of component vectors and chaotic oscillators assembly of FIG. 1.

Referring now also to FIGS. 6 and 10, the parallel memory processor and neuron array 46 is described in more detail. Processor 46 processes the pixel data 44b into feature vectors 47. Feature vectors 47 contain "arbitrary features" such as the development of unique signals caused by a deterministic interaction between the spatial image processor 10 neural network architecture and an input of an image that produces one or more feature vectors 47 of an image. Each feature vector 47 is relative to the image's local intensity gradients about a pixel in a retina array. Feature vectors 47, which are developed from similar intensity gradients, are grouped as "common features" 55. Component recognition vectors 49 are the result of a process in a space called the memory vector space 59. The sparse neural activations within memory vector space 59 form memory vectors 63, as shown in FIG. 10. Memory vector space 59 and a memory vector 63 have a corollary to the visual cortex in a brain and the neural activity as seen in a position emission tomography and/or a nuclear magnetic resonance process when a subject views an object. The memory vector 63 is the equivalent of the pattern of activity, caused by a stimulus, and the memory vector space 59 is the equivalent of the "space" of the cerebral cortex where all possible "recognition activities" may occur. Thus, when an input stimulus is applied to the spatial image processor 10, a sparse memory vector is active in the memory vector space.

Figure 7:
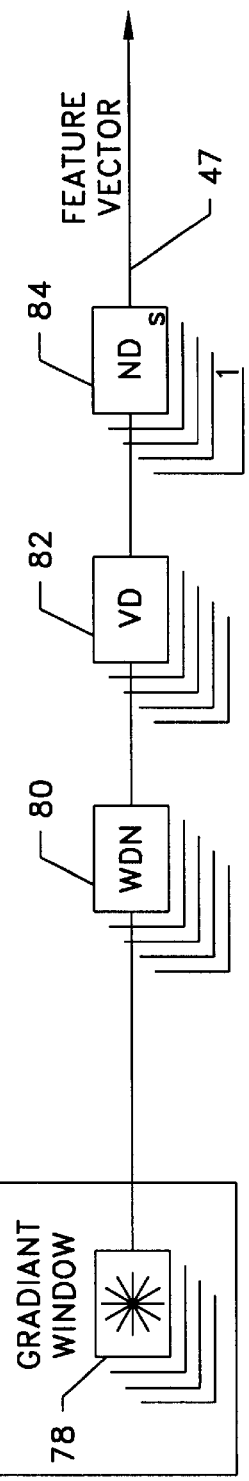
FIG. 7 is a diagrammatic illustration of a portion of the localized gain network and parallel memory processor and neuron array of FIG. 6.
Figure 8:
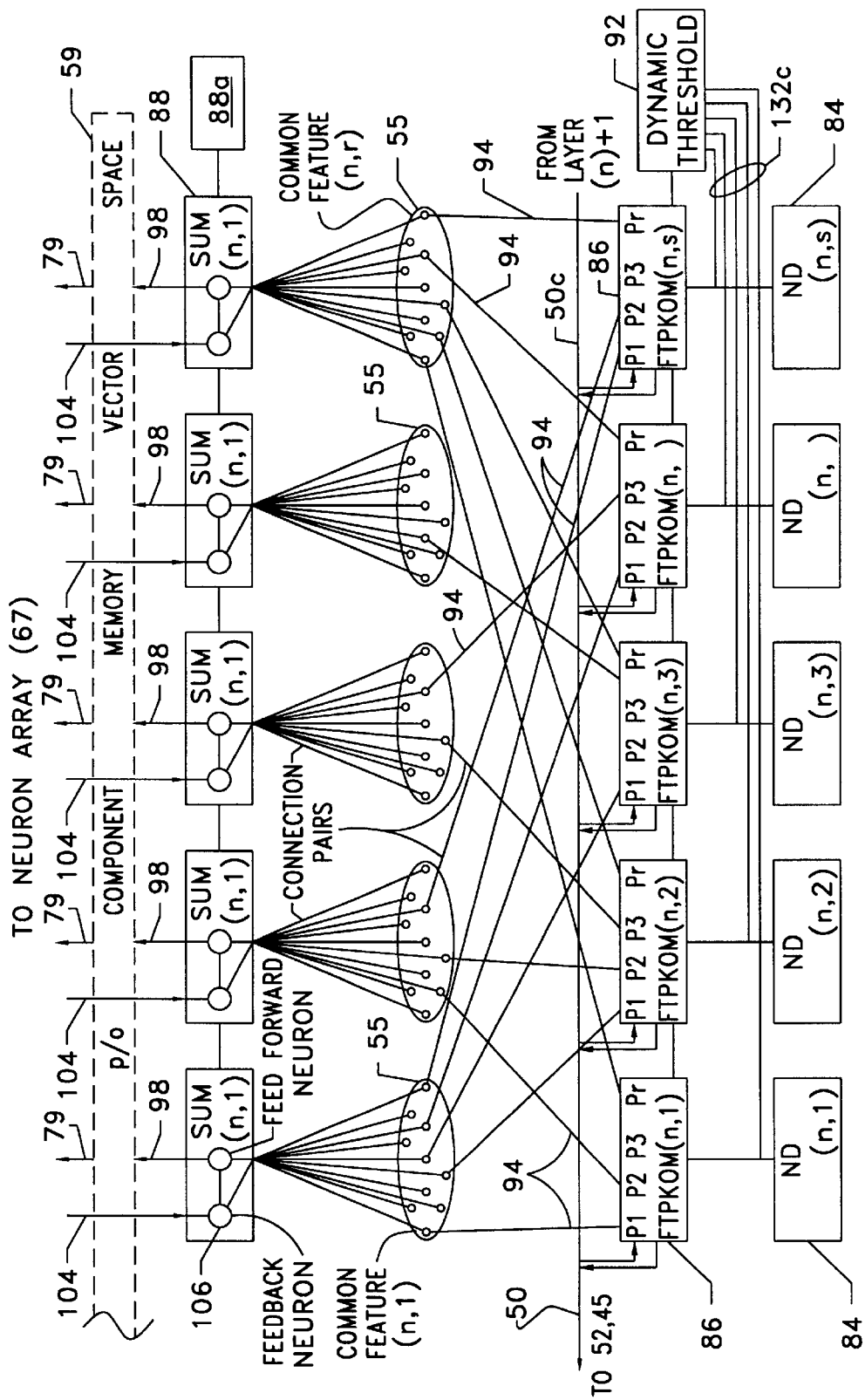
FIG. 8 is a diagrammatic illustration of further portions and functions of the parallel memory processor and neuron array of FIGS. 1 and 6.
Figure 9:
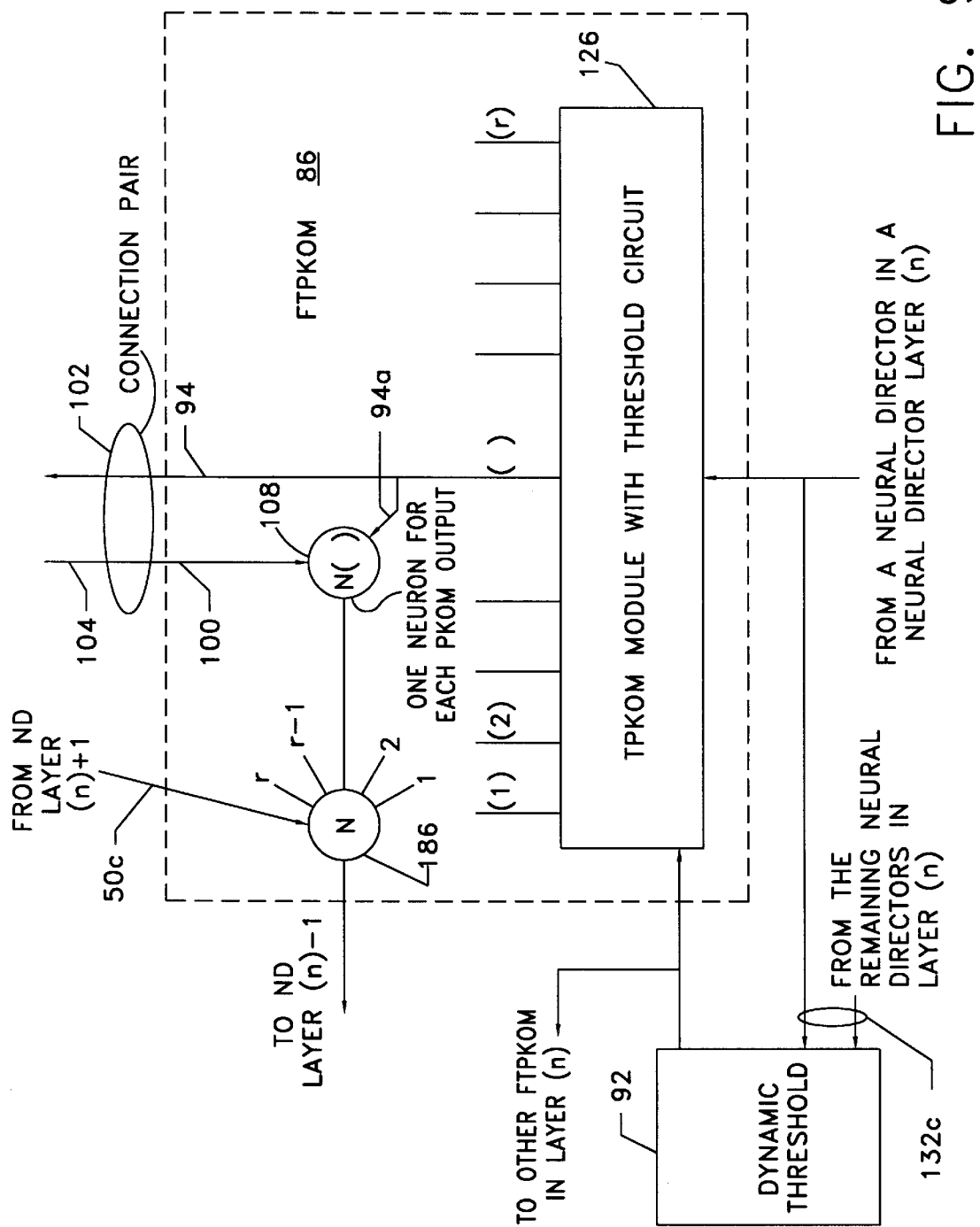
FIG. 9 is an enlarged diagrammatic view of components and functions of a portion of the parallel memory processor and neuron array of FIG. 8.

The array of scalar data 44b from LGN 45 spatially represents a retina of data. Therefore, LGN 45 output data 44b "becomes" the spatially virtual retina 72, which is part of an image position and size invariant retina 74 in parallel memory processor 46. This assignment of the data 44b as the virtual retina 72 provides a continuity and integration of U.S. patent application Ser. No. 09.641,395 into the spatial image processor 10. The image position and size invariant retina 74 outputs a multidimensional feature vector 47 for each pixel in the retina. The multidimensional feature vector 47 represents the local image gradients about each pixel. Referring also to FIGS. 7–9, a gradient window 78 is of a star sapphire-like shape with many points that are lines of pixels. The central pixel in the gradient window 78 is the reference pixel from which the differences to all other pixels are formed in a window difference neural network (WDN) 80. These differences are decoupled and dispersed in a vector decoupler (VD) 82 and neural director (ND) 84 to produce the feature vectors 47. There is one feature vector 47 for each pixel; thus, the image position and size invariant retina 74 output feature vector 47 is a vector of local vectors. There is a "dimensional explosion" of data as compared to the image pixel data 44a to that of the image position and size invariant retina 74 output 47. This dimensional increase allows linear separation and collection of feature data in a higher dimensional space.

The array of feature vectors 47 has a dimension of "s" times "r", where "s" is the pixel dimension and "r" is the output dimension of each ND 84, as shown in FIG. 7. The output dimension "r" is proportional to the combinations of pixel comparisons within gradient window 78.

The image position and size invariant retina 74 provides output feature vectors 47 which are processed by a parallel set of constructed neural network memory processors, each comprising a multiplicity of multi-layer ND's 84, feedback and threshold positional king of mountain networks (FTPKOM) 86, and sum neural networks (SUM) 88. Each memory processor, with its multi-layer ND's 84 and FTP-KOM's 86, is a local processor that increases the resolution of the local gradient data about a single reference pixel (p,q) in the retina and then reduces it to a low dimensional vector. Each of the local pixel (p,q) memory processors operates independently on its local feature vector 47 up to the FTPKOM module output space. The local memory processor functions similarly to that described in U.S. patent application Ser. No. 09/477,638. A FTPKOM module 86 (FIG. 9) is a special positional king of the mountain (PKOM) device with variations in its design. The first variation is the use of a fixed or a dynamic threshold 92 that has its maximum level set to a relative value of the highest peak neural director output for all pixel (p,q) memory processors and for all neural director 84 layers. The minimum threshold is set relative to the peak self noise, or image noise level of any pixel (p,q) memory processor neural director 84 layer. This FTPKOM module 86, besides limiting the output to one output, limits nonessential low contrast image activations and inhibits any output when there is not a graded pixel set around the associated reference pixel in the image position and size invariant retina 74 (FIG. 6). At least one or more neural director 84 output neurons must be greater that the threshold 92 value to activate a FTPKOM module 86. The threshold operation will be covered in more detail herein below. The second variation to the FTPKOM design is associated with the feedback paths, to be discussed in the paragraph below.

Continuing with the local memory processors, the FTP-KOM module 86 outputs 94, as shown in FIG. 8, are organized through virtual common features 55. Each SUM 88 accumulates only similar feature activations from each FTPKOM module 86 and each sum 88 neuron input value is subtracted by a threshold 88a value to allow only essential features to the sum output neuron 88. Sum neural network outputs 98 (FIGS. 6 and 8) become inputs to the memory vector space 59.

Referring again to FIG. 10, a component recognition vector 49 is a matched filter instantly trained to recognize a whole object, such as a component object or a temporal component object. A component recognition vector 49 contains a neuron 67 (feedforward neuron) and a set of connections 79 matched to a pattern called a memory vector 63, which is the result of an input component object image. Each component recognition vector 49 is used to recognize a specific memory vector 63 of activations.

An array of component recognition vector neurons 67 includes feedforward neurons 67a, which activate the passage of a temporal signal through a feedback neuron 67b. A combination of a recognition vector neuron 67 and a group of component recognition vector connections 79 provides for the output of the component recognition vector 49. An active memory element 110 is shown in FIG. 10 as a single active element to simplify the drawing and the conception of the memory vector 63. Each active memory element 110 is in reality the highest representation of a group of individual activities of SUM's 88 (FIGS. 6 and 8). The connection values for all sum neural networks are unit values and comprise connection pairs 102 (FIG. 9). The connection pairs 102 conduct feature information in a feed forward mode and receive feedback activations 104 in return along a parallel path. The matching of sparse connections 79 of component recognition vectors 49 to their memory vectors 63 is shown in FIG. 10, the connections being learned in pairs of parallel paths. Each connection pair 79 consists of a normalized vector element value in the feedforward path and a unit connection value in the feedback path.

Figure 2:
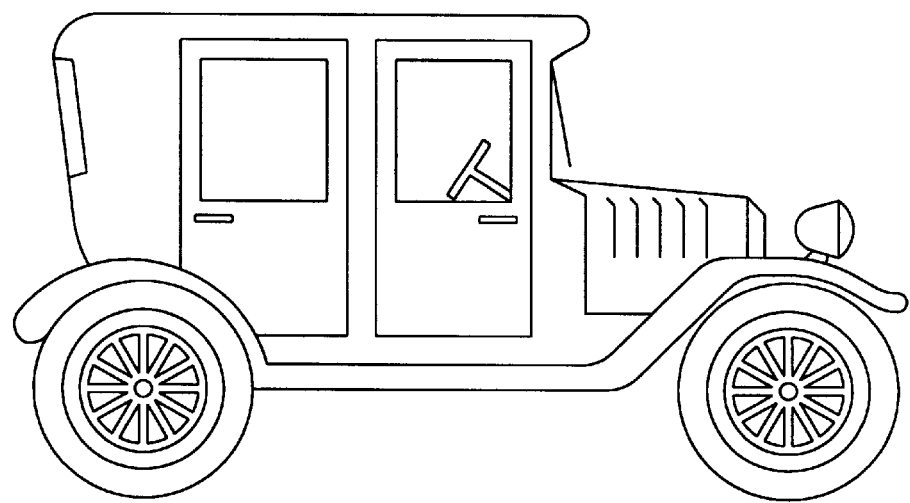
FIG. 2 is a side elevational view of a car comprising a multiplicity of components.
Figure 11:
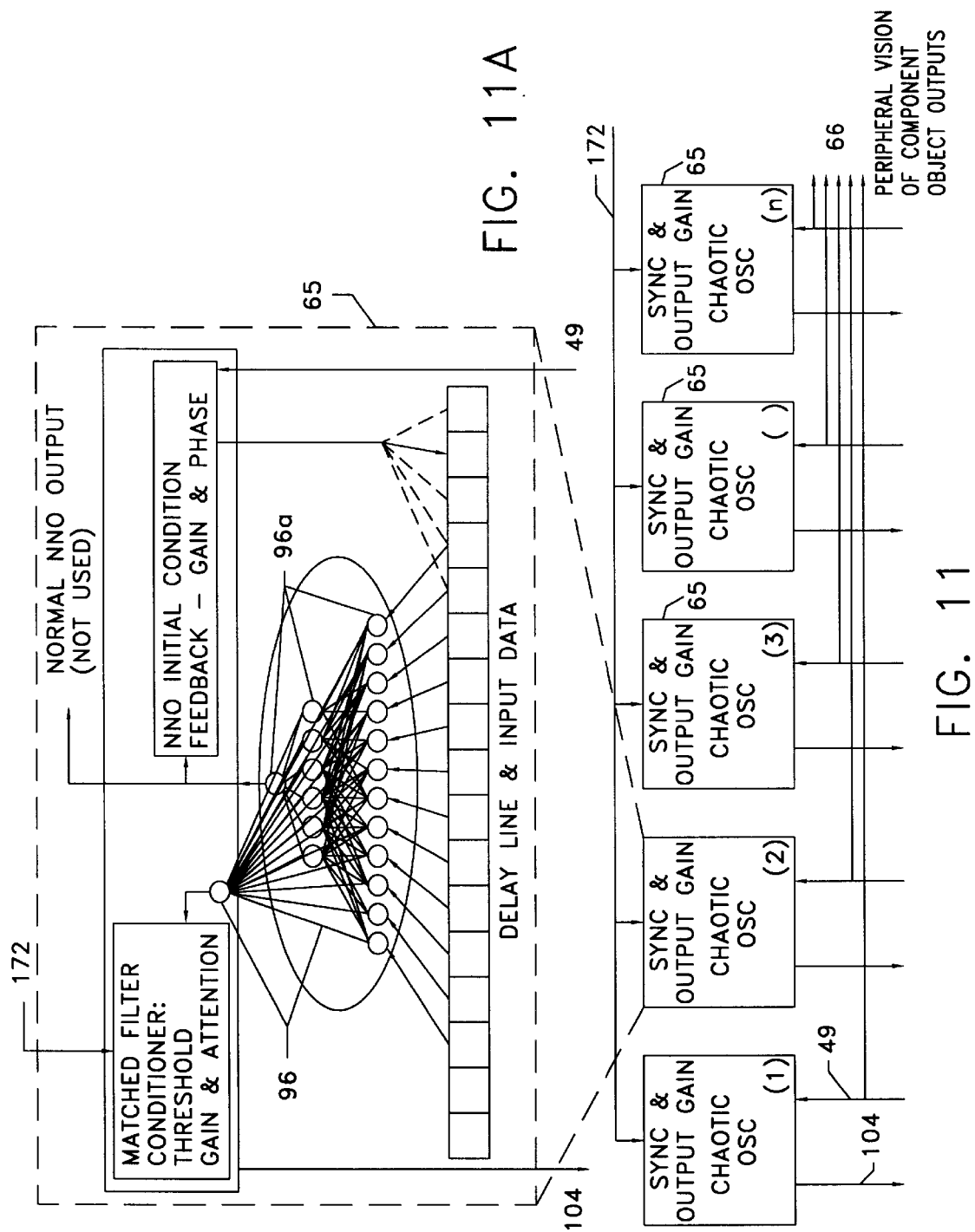

Referring now also to FIG. 11, the activation of a component recognition vector 49 produces a peripheral vision object activation 66 (FIGS. 1 and 11) and activates its chaotic oscillator 65 in component recognition vectors assembly 48 (FIG. 11). The architecture that allows two or more concurrent object recognitions is the sparse connections 79 of the component recognition vectors 49 (FIG. 10) and their component object memory vectors 63 (FIG. 10) in a high dimensional space. The component recognition vectors 49 provide spatial nonlinearities in the memory vector space 59 of the component memory vectors 63 (FIG. 10), as well as the classic nonlinearities caused by thresholds and/or FTPKOM circuits. The component recognition vector processings and the virtual common feature space architectures are the data paths that allow the peripheral recognition of an object in any position of the retina. Also, the storage and recognition efficiencies of this invention are based upon the fact that low level component objects are stored in memory, which can be used for other visual objects in different spatial configurations. There are as many component recognition vectors 49 as needed to support all of the output classes in the preferred embodiment of the invention. At this point in the architecture, the car components in FIGS. 2 and 3 will activate identical component objects.

The spatial image processor 10 provides peripheral vision object activations 66 (FIG. 1) from low level component object recognition activations 110 from a module of recognition vectors 49 (FIG. 11) of the parallel memory processor and neuron array 46 (FIG. 1) as a component object's optical image can be recognized away from the retina's fovea center. In this instance, the term "module" represents a neural circuit, a neural network or a module of modules that performs a specific process. Modules 46, 48 and 56, 58 (that is, parallel memory processor and neuron array 46, component recognition vectors assembly 48, temporal parallel memory processor 56, and spatial recognition vector array 58) are similar modules with similar processes and components but with slight differences in each. Modules 46 and 56 receive the same pixel data signal through parallel paths, 44b and 44c. Therefore, the active pathways to the component recognition vectors are the same in each group of modules. The modules 46, 48 connect the pixel data through a neural process to specific component object recognitions and activate their chaotic oscillators 65 which produce temporal output pulses. These pulses (feedback) are only allowed travel along the same paths (connection pairs carry feedforward signals and feedback signals). The signal from the feedforward enables the feedback at each neuron in the feedforward pathway. Thus, only the temporal signal of one chaotic oscillator can follow the path back toward the relative pixel positions that enabled it. This feedback signal performs two processes. One is to increase the gain of the image input path that activated itself (attention 50a to the LGN) and the second is to apply the temporal signal 50b to its relative pixel positions in the temporal spatial retina 52. The "temporal" group of modules 56, 58 carry the pixel data through the same pathways as the feedforward paths above, but in the "temporal" group, these pixel signals activate each neuron's ability to pass "common mode" or superposed temporal signals through the feedforward process to its temporal component object recognition vectors 122, comparable to the component object recognition vectors 49 of module 46. Thus, only the temporal pulses that started their path from the activation of chaotic oscillators 65 find their way through spatial retina 52 and processor 56 to temporal component object recognition vectors 122. The temporal signal is a broadband signal superposed on the pixel data signal just as a video tape recorder "carries" the bias signal on the video signal. The lower band pixel data (LGN signal 44c) enables a neuron, in the feedforward path receiving the pixel data, to also pass the broadband signal along the same path. A broadband signal superposed on a negative or zero pixel value signal cannot pass through a neuron in the temporal group neural network. Thus, the temporal group operates as a "specially controlled multiplexer circuit" to pass the temporal pulses only to specific places in the neural circuit. The special controlling signal is the input image itself and the "multiplexed paths" are relatively continuous (not uniformly stepped from sample to sample, except as changes of input images, which change the temporal pulses from path to path). Note, since both groups contain effectively the same modules the word "temporal" precedes a neural network module name in the temporal group; such as the "temporal component object recognition vectors" 122, as opposed to the "component object recognition vectors" 49.

A component object activation starts a narrow band chaotic oscillator 65 (FIGS. 11 and 11A), of the type disclosed in U.S. Pat. No. 5,446,828, and modified to produce a series of deterministic patterns. Each chaotic oscillator 65 produces a different set of temporal patterns and contains a matched filter 96. The matched filter 96 and a dynamic threshold produces one best match of the temporal patterns to produce a single broadband output pulse per cycle of sequential patterns. The chaotic oscillators 65 have similar repeatable pattern periods. The matched output 104 of connection pairs 102 is a positive temporal activation pulse that represents its component object at a relative time and this pulse is fed back along each feedback activation path of the connection pairs 102 (FIG. 9). The relative time is in comparison to other associated common component temporal pulses. The temporal activation 104 returns through the feedback path of the component recognition vector 49 (FIG. 10) to a sum feedback neuron 106 (FIG. 8) and continues back to each FTPKOM 86 that originally provided part of the component recognition vector activation. While sum feedback neuron 106 contains connection pairs 102, which feedback temporal activations to all FTPKOM 86 circuits, the temporal activations dead end at those FTPKOM 86 circuits that did not provide the original feature activations for the component recognition vector 49 because the FTPKOM feedback neuron 108 (FIG. 9) is not enabled for the specific feature. The active FTPKOM feedback neuron 108 that is enabled, as indicated by enabling path 94a of output 94, feeds the temporal activations 104 through the FTPKOM sum neuron 186. At sum neuron 186, all activations 104 from enabled feedback neurons 108 are combined together with temporal activations from other neural director layers, designated as 50c in FIGS. 8 and 9, to feedback signal 50. Thus, the temporal activations 104, as 50c, pass through all FTPKOM layers to become feedback signal 50, which is provided, as temporal activations 50b, to the relative neuron positions in the temporal spatial retina 52 represented by the FTPKOM. The temporal activations 50 are also passed to the same relative neuron position (as 50a) in the LGN module 45, where the energy in the temporal activations 50a increases the gain of the specific LGN neuron 68. These local gain changes increase the attention of the component object by sharpening the virtual image gradients, or image contrast, about the component object and reducing the gradients for all other objects not activated. The vector normalizer 70 (FIG. 5) causes a reduction of other gradients when the attention gain is increased. The processing function of a vector normalizer 70, in LGN 45, is to generate and maintain a unit vector from all pixel element values. Thus, when a selected group of pixel neurons 68 of an object attention are increased in gain, the greater attentive pixel element values will reduce the contrast of all other non-essential images. High attentive values have the ability to effectively "remove" other images from the field of image processing.

Figure 12:
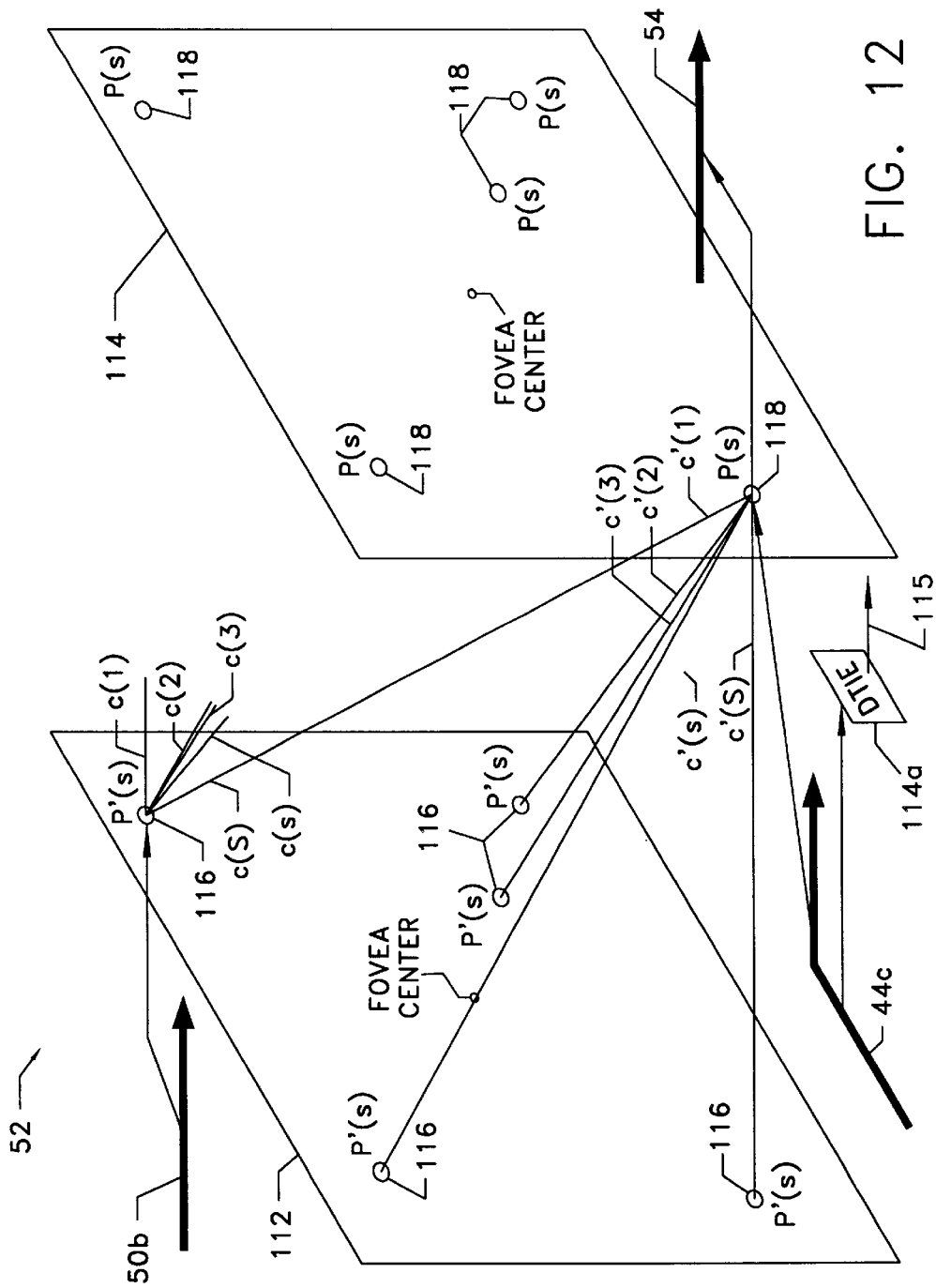
FIG. 12 is a diagrammatic representation of functions of portions of a temporal spatial retina of FIG. 1.

Referring now to FIG. 12, the temporal spatial retina 52 (FIGS. 1 and 12) contains an architecture that senses the spatial configurations of the component objects. The temporal spatial retina 52, as shown in FIG. 12, contains two arrays 112, 114 of neurons. The input array is the temporal retina 112 and the output array is the spatial retina 114 that combines temporal signals with each LGN pixel datum 44c into temporal spatial data signals 54. Each retina of temporal spatial retina 52 contains an array of neurons in the same pixel orientation as the input array 40 or each of the arrays of the LGN 45 neurons 68, 68b (FIG. 5). In FIG. 12, each spatial retina neuron 118 is connected, respectively, from the appropriate LGN neuron 68b and the appropriate temporal activation connections from temporal retina array 112. Various component object temporal signals from 50b activate temporal retina neurons 116 and are distributed, through connections, to the spatial retina neurons 118 to generate the multiple temporal signals. The temporal signals are further superposed into the relatively steady LGN output pixel data 44c. The temporal and LGN signals are processed in different ways. Both activations, from 44c and 50b, become two-dimensional signal 54. Thus signal 54 can be seen to have two components: 54b, the slower changing LGN output signal (low bandwidth) from 44c; and 54a, the broadband signal from 50b, superposed on 54b. It then activates the multidimensional gradient data through their active paths in temporal parallel memory processor 56 and spatial recognition vector array 58. Signal 54b is processed through processor 56 in the same manner as pixel signal 44b is processed through processor 46. The positive values of the signal 54b are used in processor 56 to control the active paths of the broadband temporal signals 54a. Each neuron in processor 56 and array 58 that operates upon signal 54b contains a broadband neuron component that is positively activated only when signal 54b has an activation corresponding to that neuron. These activations are the way that the multipath signals 54a are passed through the temporal neural modules.

A Dynamic Temporal Input Enable (DTIE) 114a module receives all 44c signals and generates an output value that is a proportion of the peak pixel signal 44c and enables selective temporal signals 50b received by the spatial retina 114. All spatial retina neurons 118 receive an enable signal 115 from DTIE 114a that will enable a neuron 118 to accept temporal signals from the temporal retina 112 providing the neuron 118 has a 44c pixel input value greater than the enable signal 115. The enable signal 115 does not affect the values of pixel signals 44c to any neuron 118, nor does it change the input values from the temporal retina 112 for the neuron 118 that is enabled. All neurons 118 not enabled do not receive temporal signals from temporal retina 112.

Figure 13:
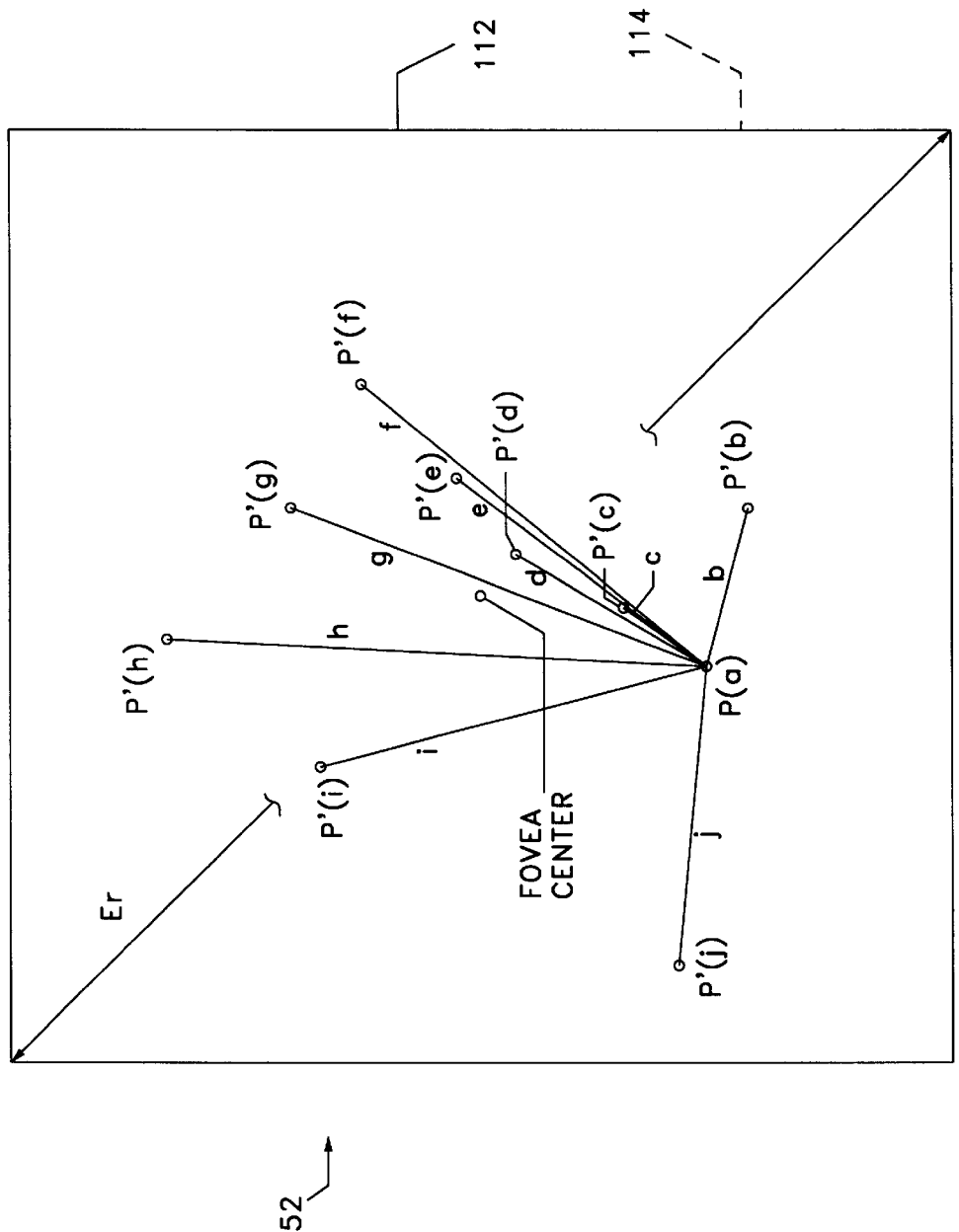
FIG. 13 is a diagrammatic representation of neuron connection values in the temporal spatial retina of FIGS. 1 and 12.

Each neuron 116 in array 112 of temporal spatial retina 52 is fully connected to a neuron 118 in the array 114. Each connection weighting values are calculated as shown in FIG. 13, for example, where array 112 is shown superposed on array 114 (dashed lines). Retina neurons 116 on the input array 112 are labeled as P' and output neurons 118 are labeled as P. P(a) is an arbitrary output neuron 118 connected to arbitrary exemplar input neurons 116 such as P' (b), P' (c) through P' (j). The Euclidean planar distances between pairs of the superposed neurons are identified as "b" through "j". The connection weight values between the arrays 112, 114 from the input neurons (P' (s), 116) and the output neuron (P(s), 118) are functions of the spatial positions of each pair of neurons. The weight value for the connection between P' (b) and P(a) is the ratio of $kb/E_R$, where $E_R$ is the maximum Euclidean distance across the retina; b is the Euclidean distance between neurons P' (b), 116 and P(a), 118; and k is a constant. The weight between P' (c) and P(a) is $kc/E_R$, and so forth. The retina 52 design of connection configurations for each neuron 118 from all neurons 116, is a set of connections that generate a gradient of "iso-connection value radii". The temporal connection value between spatially identical superposed neurons P(s) and P' (s) is zero, as neurons 116, 118 are spatially superposed, making the Euclidean distance value zero. (Note that a distance value of zero equates to no connectivity of data). To generate all temporal connections from neuron 116 of temporal retina 112 to neurons 118 of spatial retina 114, choose a neuron 116 and determine the Euclidian distances between the neuron 116 and each neuron 118 and calculate each connection value as $ks/E_R$, where s is the Euclidian distance between the neuron 116 and the respective neurons 118. Select a second neuron 116 and repeat the above process until all neurons 116 are connected to all neurons 118. Connection values activated by an image, in a fixed spatial size, will produce identical connection weight values regardless of the translational or rotational position of said image on retina 52.

Figure 14:
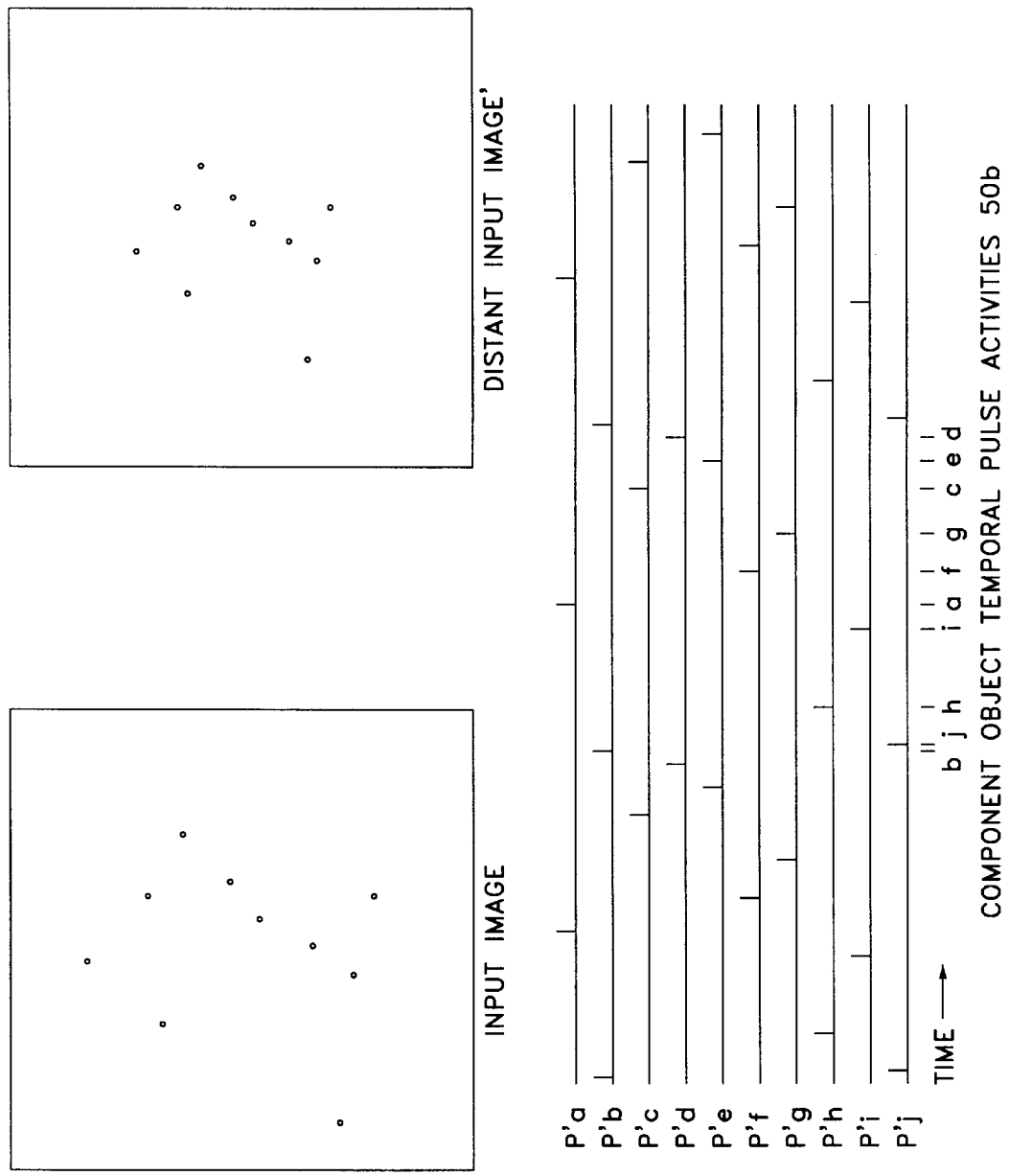
FIG. 14 shows an exemplar image of ten pixels at two different scales, or distances, including temporal pulses.
Figure 16:
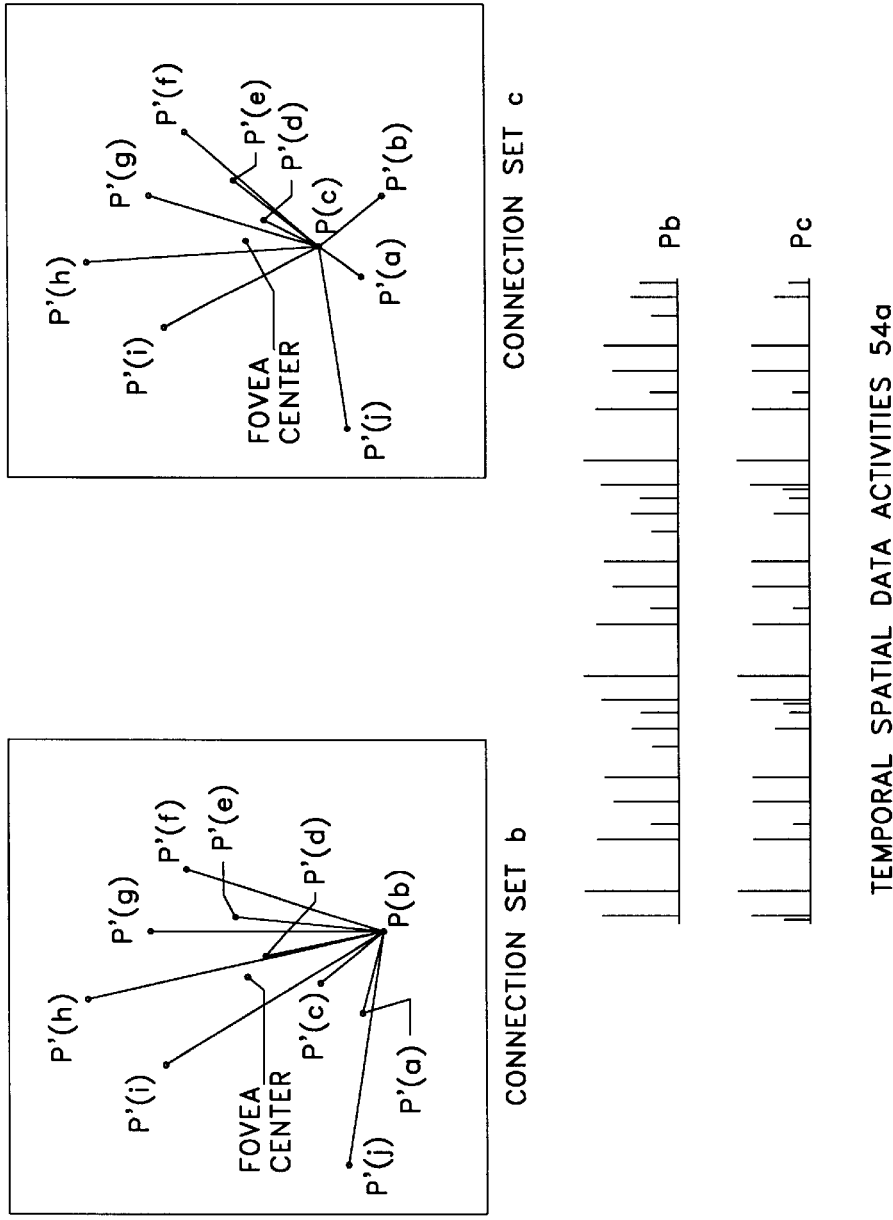
Figure 17:
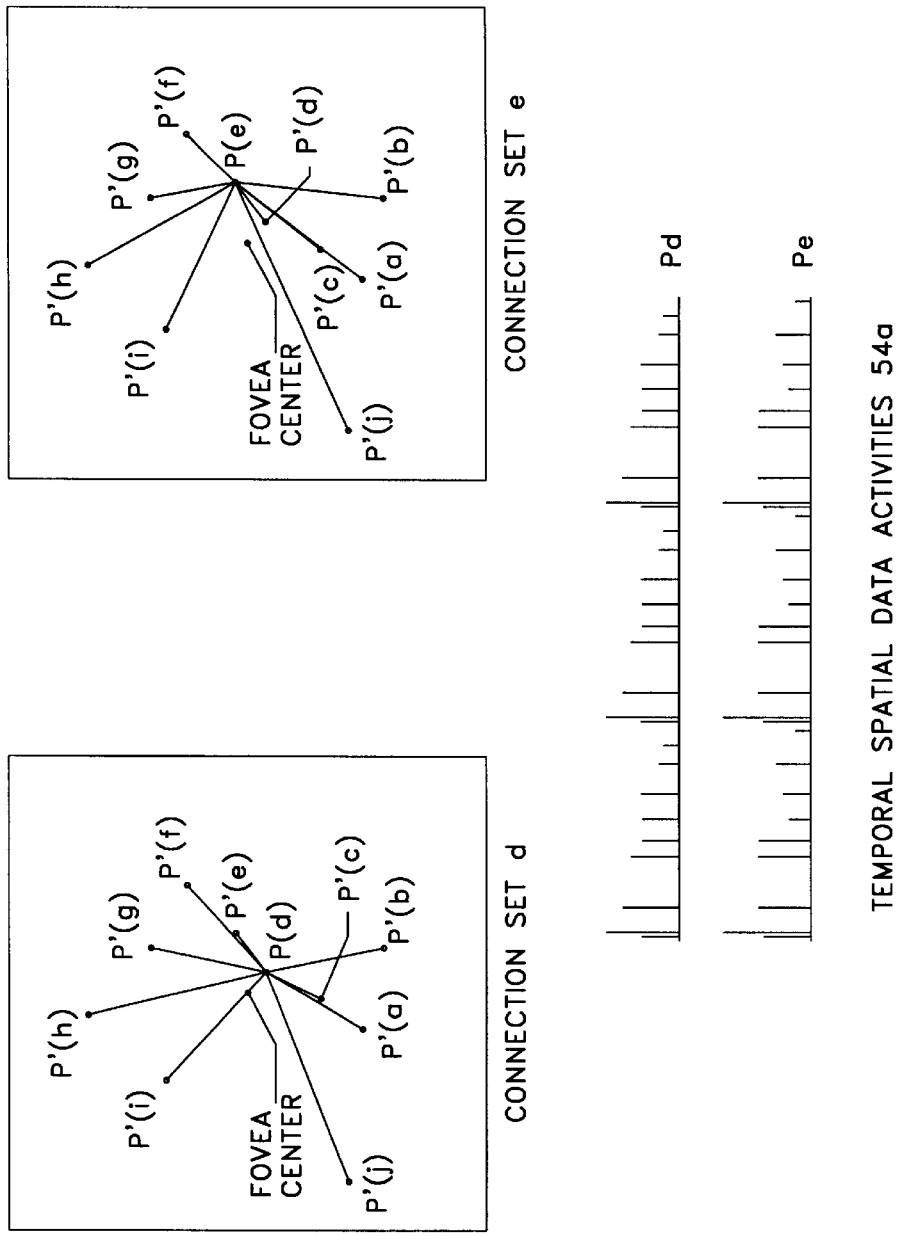
Figure 18:
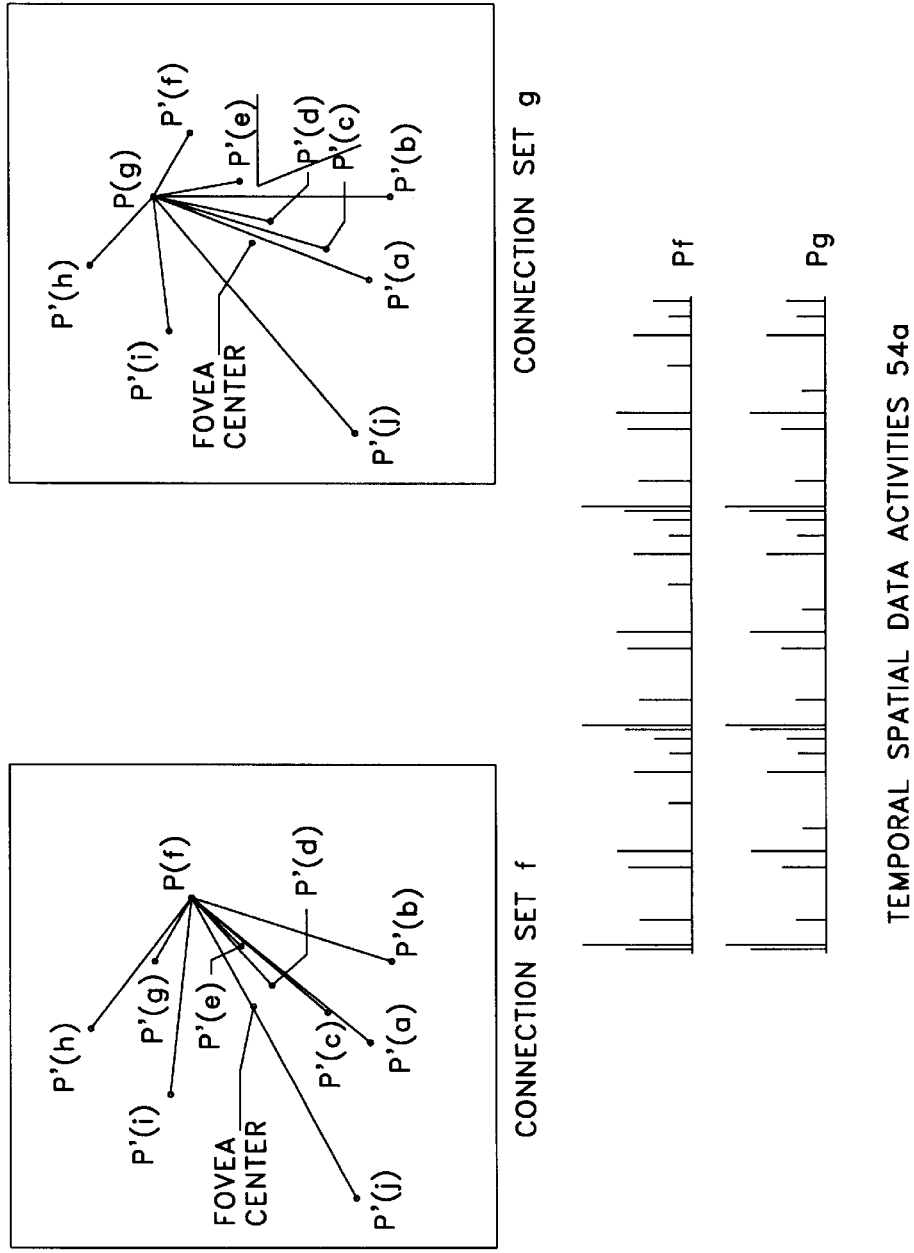
Figure 19:
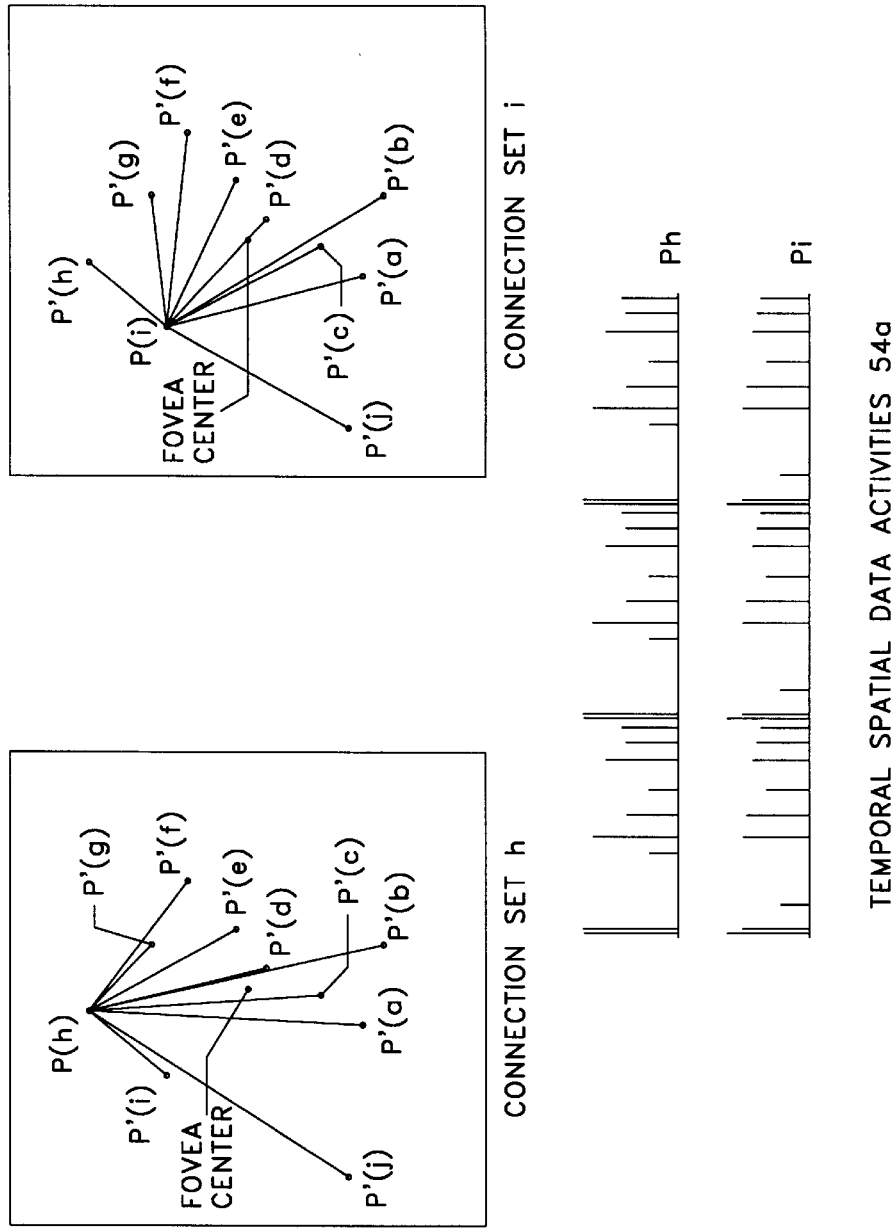
Figure 20:
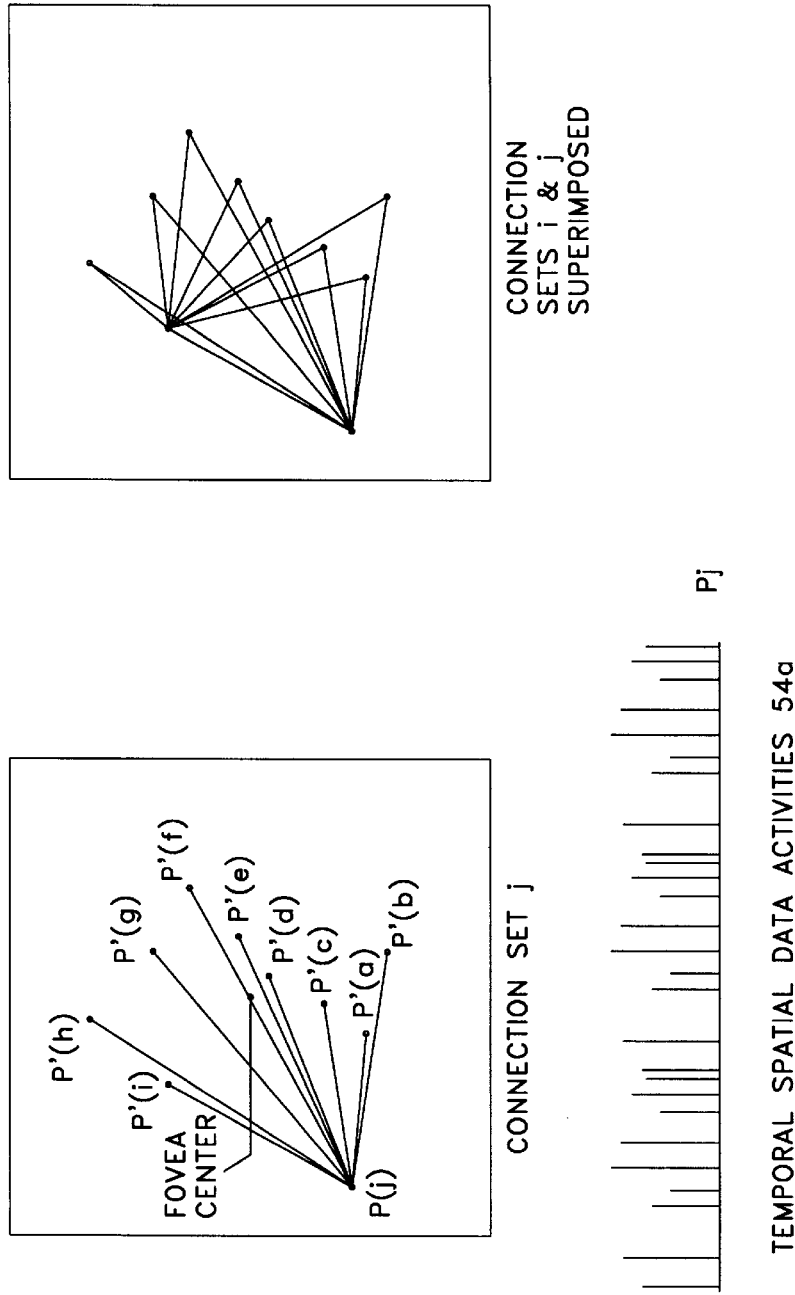
FIG. 20 is a diagrammatic representation an additional neuron connection set and temporal activation for the exemplar image of FIG. 13, including an illustration of two connection sets superimposed.

Examples of proportional valued connections and their temporal spatial data are shown in FIGS. 13 and 15–21. FIG. 13 shows an example of connections generated where one neuron 118, P(a), is connected to nine neurons 116, P' (b) through P' (j). Temporal activations that represent component object temporal pulses 50b at temporal retina 112, one each at the input neurons 116, P' (b), through P' (j), are shown in FIG. 14 for each connection as shown in FIGS. 13 and 15. The ten active pixels (neurons 116 with signal 50b and/or neurons 118 with signal 44c) of the exemplar image of FIG. 14 are used to generate spatial configuration data as component object processes for the temporal spatial retina 53, for the temporal parallel memory processor 56 and for the spatial recognition array 58. The temporal activations 50b cover the feature areas of each component object, but only a single representative neuron for each component object is shown in the example. The connection sets in FIGS. 15–20 have temporal spatial activities 54a from each output neuron 118 at P(a), connection set b at P(b), and so forth. Assume that all component chaotic oscillators 65 are synchronized in their periods, but not in their activations, and each oscillator generates a single temporal pulse activation within each repeating period. Therefore, the temporal pulse activations 50b in retina 112 occur at different times and will repeat over time, as shown in FIGS. 14. The physical spatial configuration of component object temporal pulse activations 50b at neurons 116 of retina 112 are interconnected through the unique architecture of the connections to neuron 118 of retina 114 to develop sets of temporal spatial data activations 54a at each corresponding neuron 118 and also to generate pulse amplitudes that contain information on the relative component object spatial configurations. Each set of temporal spatial data activations 54a and their Euclidian connection configurations for each neuron 118, P(a) through P(j), are shown in FIGS. 15–20. Each set of temporal spatial data activations 54a represents a repeating vector, where each amplitude at time "t" is an element of the vector. A partial set of possible activations 54a are shown in their exemplar timing order t(b), t(j), t(h), t(i), t(a), t(f), t(g), t(c), t(e) and t(d). Each output neuron 118 will see nine sets of activations in the above order per each temporal period of time, with a different set of temporal activation amplitudes dependent upon the spatial configuration of each component object and their connection value between said component object image on retina 52. The ten segments of temporal spatial data amplitudes for each of the connection sets each represent the actual spatial configuration of the ten component objects in a "multiple triangulation lock", as illustrated by the two component object triangular lock for connection sets i and j in FIG. 20. That is, each component has two or more other components in spatial triangles, which remain in constant ratios over image translation and/or scale size changes. Additionally, the ratios are sensitive to, and can discriminate component object changes in, alternate spatial configurations. It becomes obvious, using connection sets i and j as shown in FIG. 20, that the Euclidian geometry of the connection sets for the two output neurons, P(b) and P(i), contains the "multiple triangular locks", which produce two representable sets of temporal spatial data activations 54a. Thus, an input image containing hidden and/or divided component objects of a super object 60 may still result in a large number of "multiple triangular locks" so as to reliably provide a recognition of said super object 60 even when some triangular locks are missing. A super object 60 with a high multiplicity of triangular locks will also provide a high sensitivity to alterations in the component object spatial configurations and/or a high sensitive discrimination between similar images. In FIGS. 15–20, the multidimensional information in each component object output neuron 118 generates a temporal vector that is used for and contains the spatial configuration for recognition of a super object 60 image. Images containing a sufficient number of component objects can be recognized when an image is partially hidden or divided as the likelihood of the remaining visible configured component objects remain high, thus providing recognition. Humans do this mental process once they have learned an object by assuming the hidden components are still part of the whole object. The multiple neurons 118 outputs 54a will reinforce the recognition process of a spatial component object configuration. The multiple outputs, which represent component object images encompassing an area greater than a single pixel, are not shown.

FIG. 14 also illustrates a distant input image, Image', which represents the same component objects and configuration as in connection set a, but at a different scale size of virtual image, i.e., further away from the retina. The temporal data for the connection set a' is shown in FIG. 15. The set a' connection values have identical ratios to those of connection set a, and 11 will generate proportional temporal spatial data 54a, where each repeating vector from set a and a' point in identical directions in a multi-dimensional space. However, they contain vector magnitude differences representing different image sizes.

Figure 21:
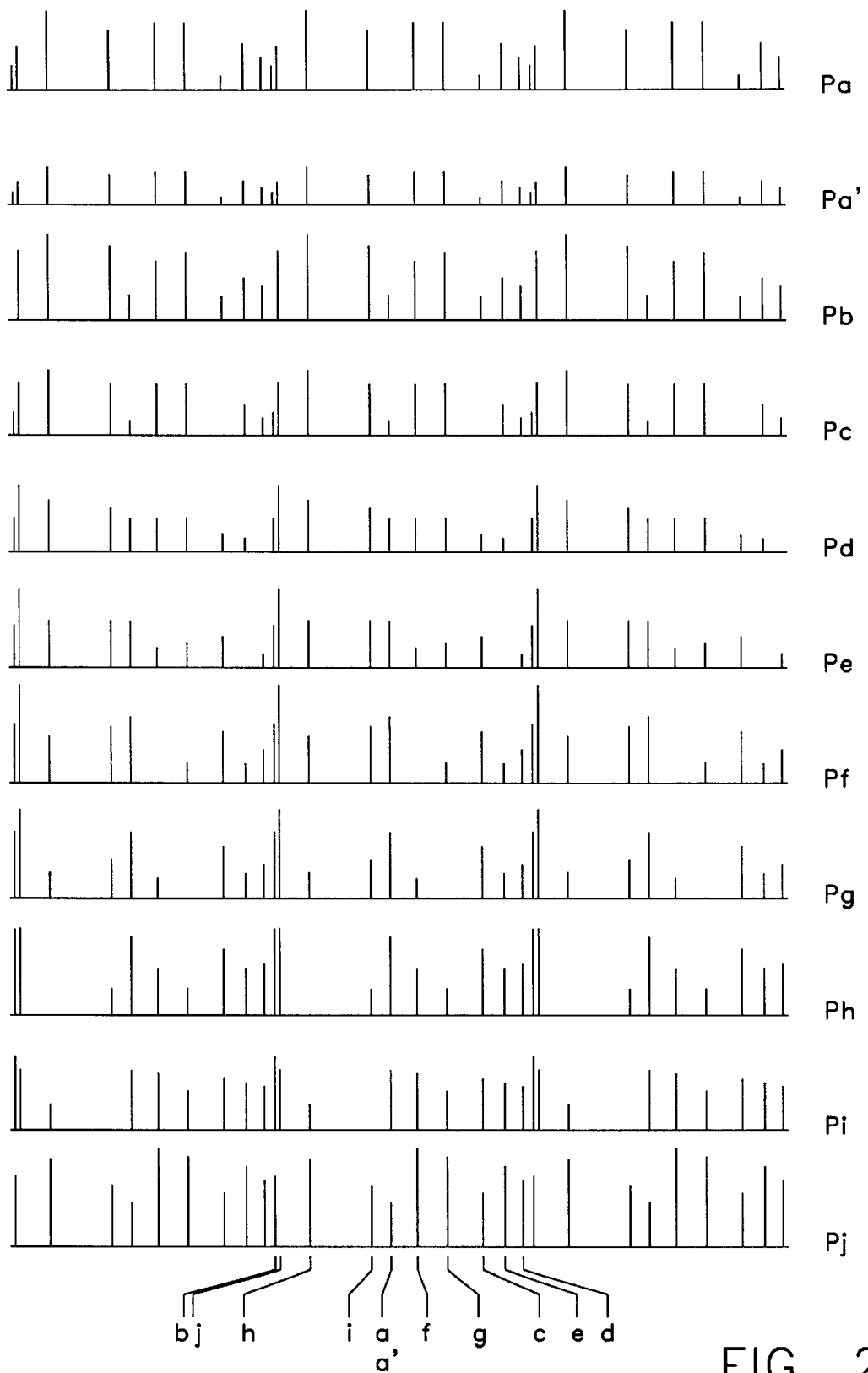
FIG. 21 is a combined graphical depiction of the temporal spatial data activities of FIGS. 14–20.

FIGS. 15–20 each show series of pulses, or pulse trains converted into pulses of temporal spatial data 54a for their respective connection sets, where each pulse has a different amplitude. FIG. 21 groups these pulse trains into a single figure for ease of comparison. The temporal spatial data repeats in time and is shown only for three cycles. One cycle in each temporal spatial data activation 54a is identified and the pulse amplitudes for the ten time marks are each different in each temporal spatial data activation 54a, except for reciprocal connection values. Note that one of the time marks in each group has an amplitude of zero due to its connection value of zero. Also, all temporal spatial data activations 54a, representing one super object 60, are in synchrony with each other, as each pulse active at one instant of time is the same component object activation 50b of FIG. 14. FIGS. 13 and 15–20 identify component object spatial configurations in a superposition of retinas 112 and 114 and show only the relevant connections in each connection set that develop the respective temporal spatial data 54a signal trains of FIG. 21. The relative amplitudes contain the spatial relationship between the ten input neurons 116/118, where each connection set is a different relational aspect of the ten neurons, and show each temporal spatial data generated by their respective neural connection aspects. Identical input images shown in FIG. 14, each activates its appropriate connection set a or set a' as shown in FIG. 15, and each input image has the same input aspect and image spatial configurations, although of different sizes. Thus, the temporal spatial retina 52 generates identical amplitude ratios within each temporal spatial data activations 54a, providing identical temporal vector directions that represent identical recognitions. The spatial image processor 10 processes multidimensional vectors and temporal multidimensional vectors to determine the vectors' directions in a multidimensional space as a recognition process.

Figure 24:
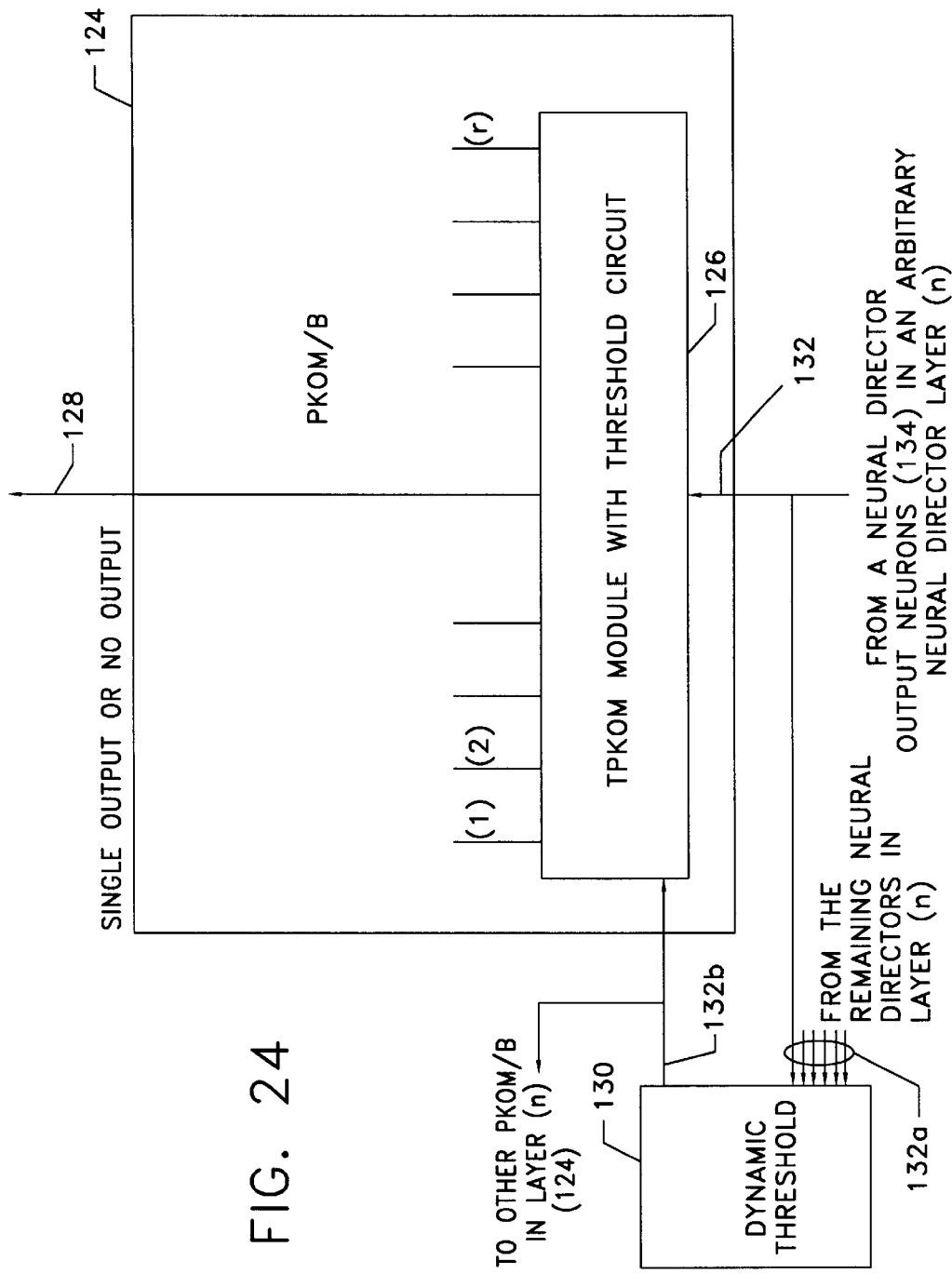
FIG. 24 is an enlarged diagrammatic representation of a portion of the temporal parallel memory processor of FIG. 23.
Figure 25:
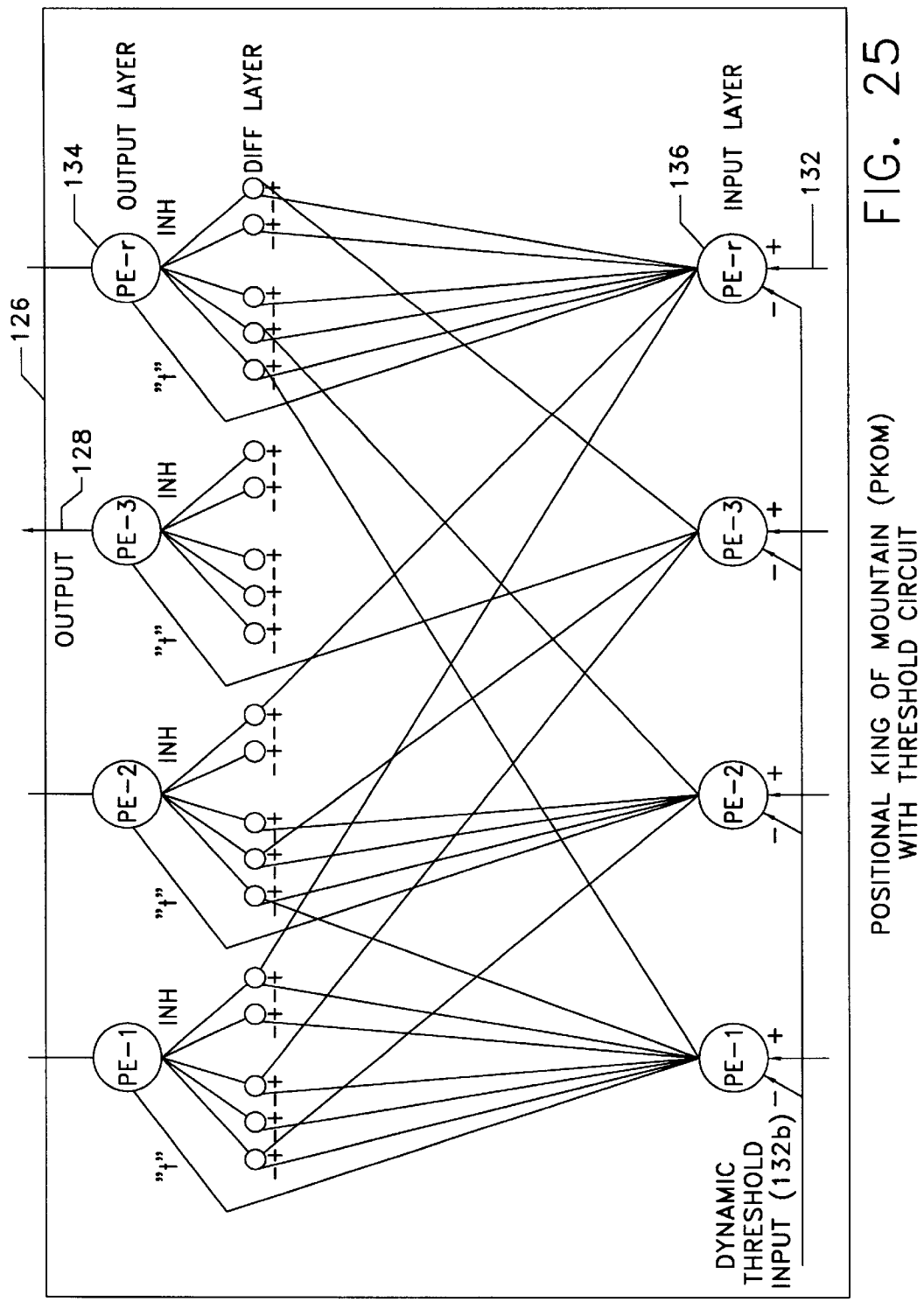
FIG. 25 is a detailed diagrammatic representation of a portion of the network subassembly of FIG. 24.

Referring now also to FIGS. 22–27, the steady state LGN data 44c passes through the temporal spatial retina 52 unchanged and becomes the signal 54b component of signal 54 input to temporal parallel memory processor 56. The LGN data 54b is processed in the temporal parallel memory processor 56 exactly as the pixel data is processed in the parallel memory processor and neuron array 46 (FIGS. 1 and 6). Besides the existence of the feedback paths in processor 46, the LGN data 54b in FIG. 22 produces the same temporal component memory vectors 122 as the component memory vectors 49 shown in FIG. 6. The TPKOM 124 of FIG. 24 are the same as the FTPKOM 86, but they do not contain feedback circuits. The TPKOM 124, besides limiting the output to a single output connection 128, in conjunction with the dynamic threshold 130, also limits the nonessential low energy activations and inhibits an output when there is not a sufficient gradient in the gradient window of retina array 72a. The TPKOM circuit is controlled by a dynamic threshold 130, as discussed above, and as shown in FIGS. 23 and 24. The dynamic threshold 130 receives the output energy 132 (FIG. 24) from all neural director 134 output neurons (FIG. 23) in its layer, shown as 132a in FIG. 24. Threshold 130 then develops a threshold as a percentage of the highest energy (as required by design considerations) and passes the threshold, as 132b, to all PKOM modules 126 (FIGS. 24 and 25) in the same layer. The threshold is subtracted from each input neuron 136, as seen in FIG. 25. The output neuron 134 has a "t" and INH inputs. Any INH positive value input will unconditionally inhibit the output neuron 134. The "t" input, when a positive value, will allow an output of a unit value, otherwise the output is zero. The input neuron 136 that contains the highest positive output value will produce all negative outputs in its own difference layer allowing a unit output to occur through its "t" connection. The highest output of an input neuron 136 will inhibit all other output neurons 134. When the threshold is the highest of all inputs, then all of the output neurons 134 are zero. It is noted that the threshold 92 operation for FTPKOM 86 (FIG. 9) operates in the same manner as threshold 130 of TPKOM 124, i.e., threshold 92 receives the output energy 132c (FIG. 9) from all neural director 84 output neurons (FIG. 8) in its layer. Further, the operation of FTPKOM 86 is the same as that described for TPKOM 124 relative to FIG. 25, with the exception of the "t" connection in TPKOM 124 and the feedback in FTPKOM 86. Furthermore, the operation of the sum circuit 88 is the same as that of sum circuit 89, with the exception of the temporal activations 54a described below.

Figure 26:
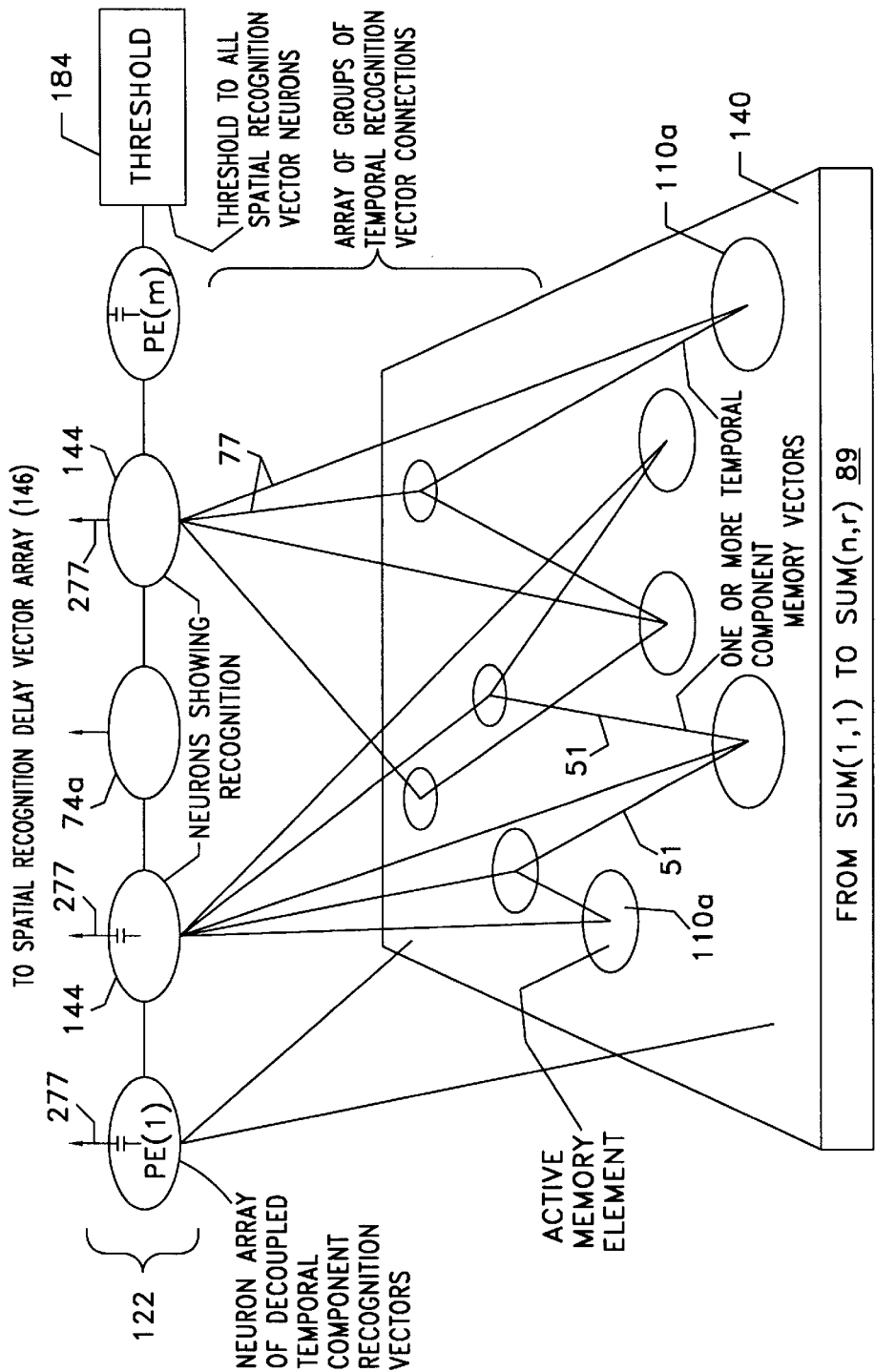
FIG. 26 is a detailed diagrammatic representation of portions of the temporal parallel memory processor and temporal component vectors of FIG. 1.

The temporal activations 54a, being a superposed signal, require minor additions that do not alter the LGN data 54b paths from the spatial retina array 114 through a temporal component object recognition vector 122. The LGN output signal 54b and the temporal activations 54a are mostly separated in the frequency domain in a manner similar to the video, or audio, being separated from its bias signal in a magnetic tape recorder. The broadband narrow pulses of the temporal spatial data activations 54a contain frequencies in a higher band than the LGN signal 54b from the image data. Each neuron in the LGN signal 54b path, from the spatial retina 114 in FIG. 12 through to the sum neuron 89 in FIG. 23, processes signals two ways. The LGN signal 54b is processed in a feedforward normal neural network method through to temporal recognition vectors 122 (FIG. 26). The same LGN signal 54b activation at each feedforward neuron also enables the passing of the temporal spatial data signal 54a, only for positive signals above a threshold, if one exists. All other LGN signals 54b will inhibit any temporal signals from passing through the output of any of the neurons in the temporal neural networks. The neurons 144 of the temporal component object recognition vectors 122 operate the same as the other temporal neurons except they do not pass any of the LGN signals 54b. They pass only the temporal broadband signals 54a to a spatial recognition vector array 58 (FIG. 27), when enabled by the LGN signals 54b. Every temporal neuron passes the temporal signal 54a in proportion to the level of the positive LGN signal 54b at the output of the temporal neuron. That is, the appropriate positive LGN signal 54b controls the gain of the temporal signal passed through the neuron.

Figure 22:
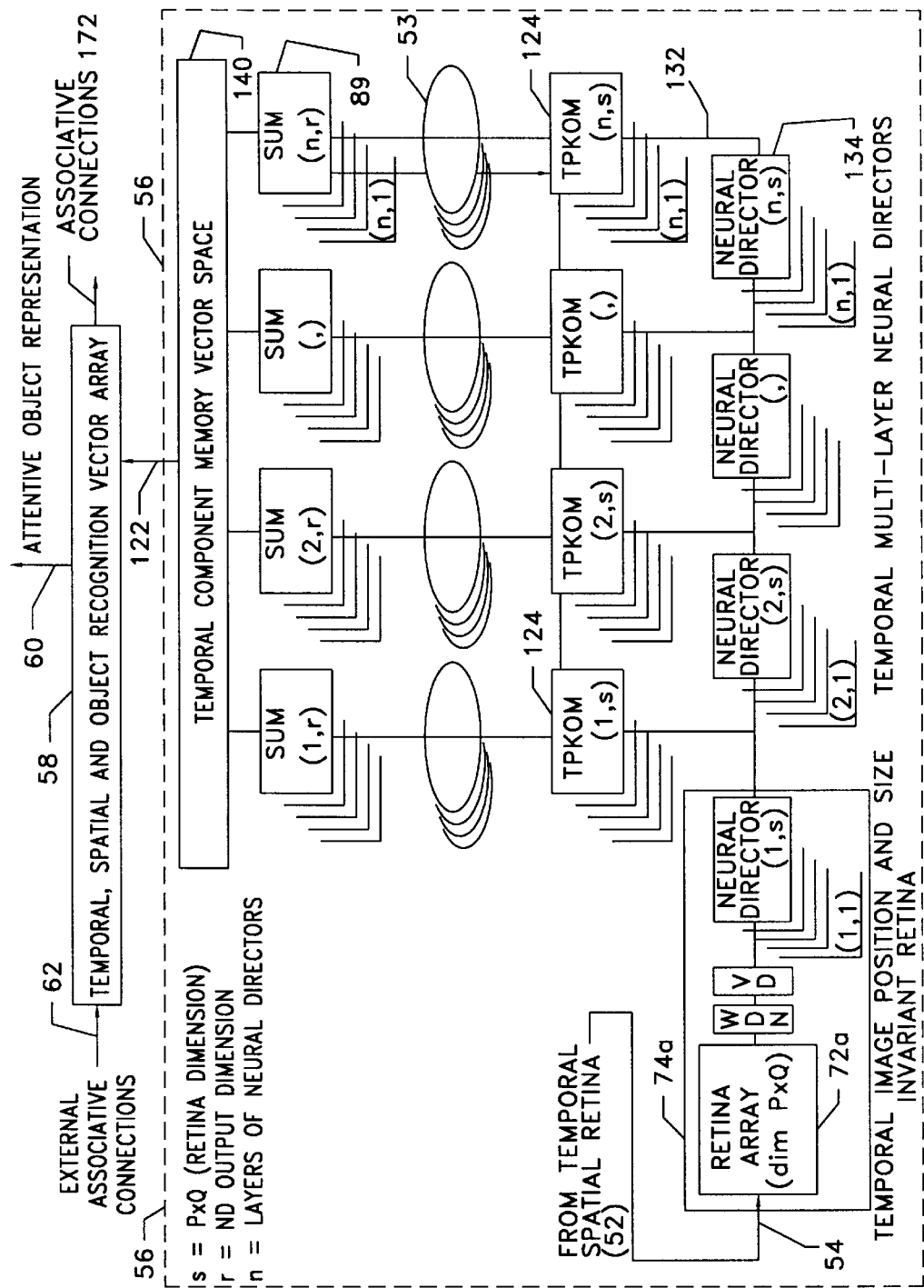
FIG. 22 is a diagrammatic representation of an arrangement and functions of portions of a temporal parallel memory processor of FIG. 1.
Figure 23:
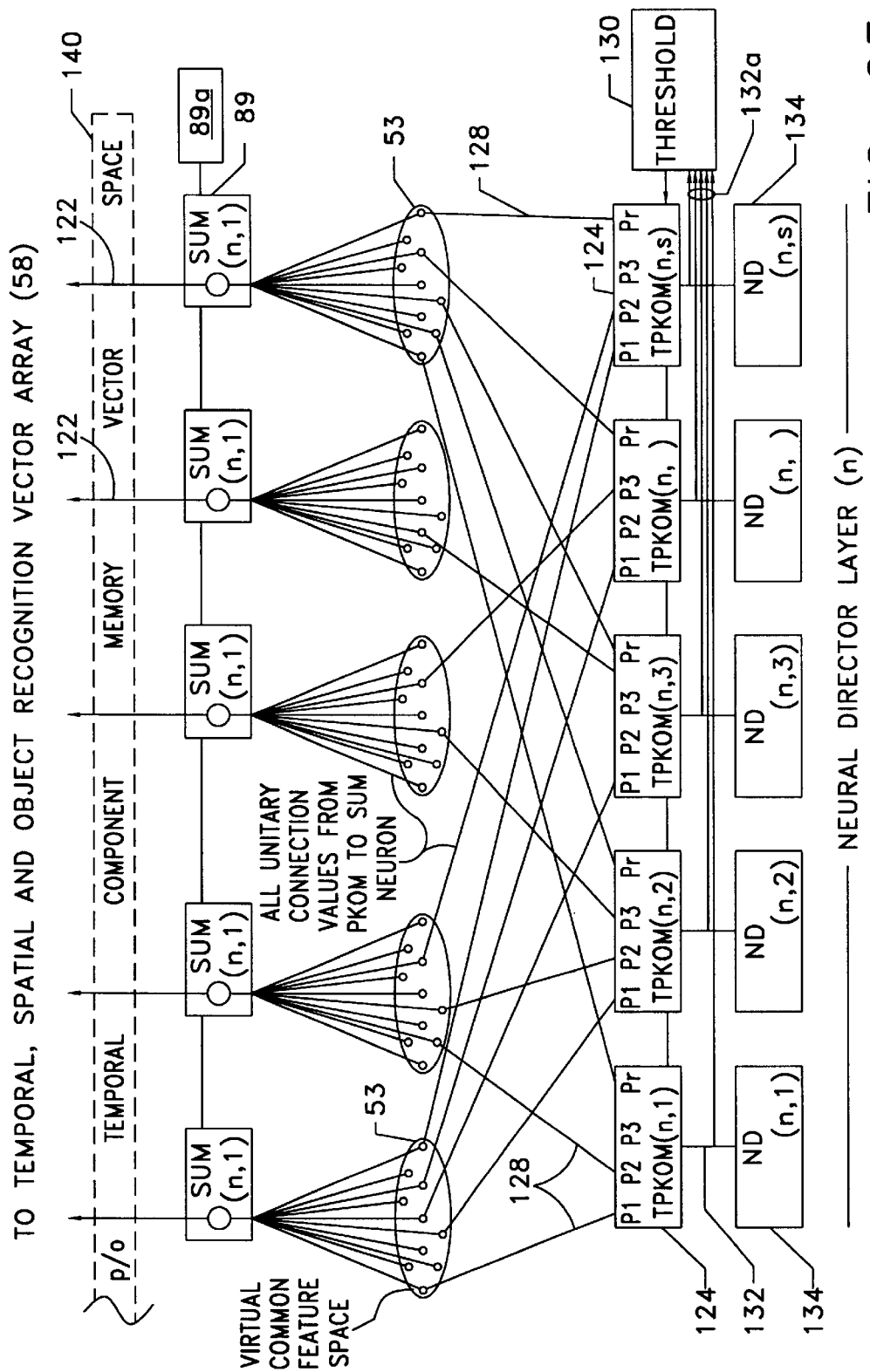
FIG. 23 is a further diagrammatic representation of functions of portions of the temporal parallel memory processor of FIGS. 1 and 22.

The temporal activations 54a use a wide band circuit that enhances only the common mode or superposed signal in the path of active LGN signals 54b. Each neuron in temporal parallel memory processor 56 contains a simple, positive signal, gain controlled, broadband coupled circuit. "Each neuron", as used herein, refers to all neurons from the spatial retina 114 output 54 (FIG. 12) through temporal component recognition vector 122 (FIG. 26), with an exception as noted above. The steady state positive value of each neuron 144 (FIG. 26) proportionally controls the coupling of its temporally activated common mode signal 54a through the neuron 144. Zero or negative output signals do not allow the passage of the common mode signal. This neuron configuration allows the common mode signal 54a to follow the activations of the component features through the neural network to the temporal component memory vector space 140 (FIG. 22).

The LGN pixel data 54b carries the temporal activations 54a through to active memory elements 110a of temporal memory space 140, memory vectors 51 and connections 77, as shown in FIG. 26 (corresponding to elements 110, vectors 63 and connections 79 of FIG. 10). The output neurons 144 activate the broadband coupled circuit that allows only the temporal activations 54a to pass to its output. The low band temporal signal 54b of activations 51 and connections 77 do not couple through to the output of this neuron type. Broadband activations 54a from an array of temporal component recognition vector output neurons 144 (FIGS. 26, 27) become the temporal component recognition vector 122 input to spatial recognition vector array 58. Spatial recognition vector array 58 may represent a class example of cars and the recognition of a super object may represent a specific type of object from that class such as an old car, 57 Chevy, or a VW Bug, each having a unique spatial orientation of their component objects as provided in peripheral vision object activations 66. Each super object class is processed in a spatial recognition vector array 58. Inputs 122 to spatial recognition vector array 58 are received at spatial recognition delay vector array (DVA) 146. DVA 146 is an array of delay vectors 288 of which each delay element 148 contains a single "learning" delay element and each delay vector 288 is connected to a Threshold and Hold Multi-King Of the Mountain (THMKOM) 150 and to a prototype "classification" neuron 156. The positive sensing Multi-King Of the Mountain (MKOM) circuit is one of two (positive and negative) MKOM circuits fully described in relation to U.S. patent application Ser. No. 09/477,653. Each delay vector 288 contains specific delay values that relatively alter a group of time elements from a spike train, as shown in the examples of FIG. 21, into a momentary vector of scalar elements. The scalar elements are processed as any set of scalar vector elements in a constructed neural network. The delay vector 288 aligns a period of temporal amplitude activations from signal 54a into a momentary multidimensional vector in which the vectors spatial direction is used for recognition of a super object.

A threshold and hold (TH) module 280 provides two processes to the connected THMKOM 150 array. In one process, the THMKOM 150 generates a threshold to the momentary input vector. The other process is a sample and hold process in synchrony with the output of neuron 156 to maintain the momentary vector values for a longer time but less than one period of signal 54a. It is noted that the threshold does not subtract from the input values, but it triggers an immediate "no hold" for all sample and hold values less than the threshold value. This process maintains the proper vector element ratios that are used for the recognition process. The hold input vector values appear to be steady with a short "off" period when the THMKOM 150 outputs are zero. The short "off" period is provided and will be further described below. With an example spike train signal applied to a delay vector 288, each delay element 148 synchronizes a spike representing a scalar value in synchrony at the output signal 282 of the delay vector 288. Signal 282 is a vector input signal applied to a THMKOM 150 and signal 282 repeats for each period of the spike train. Each signal 282 contains the relative spatial distribution of the component objects of a super object in process of recognition. Signal 282 is composed of signals 154, an output of each delay element 148. Signals 154 are in synchrony at one instance of time with each other, and are power summed by a class prototype neuron 156. This form of nonlinear summation provides an improved signal processing in a noisy field of extraneous "signals". The waveform 64, or prototype activation, at the output of neuron 156, will be a large amplitude signal, repeating and synchronized within the period of signal 54a, with a possibility of many smaller pulses occurring at "random" times between the large, time shifted, synchronized, repeating signals.

Figure 27:
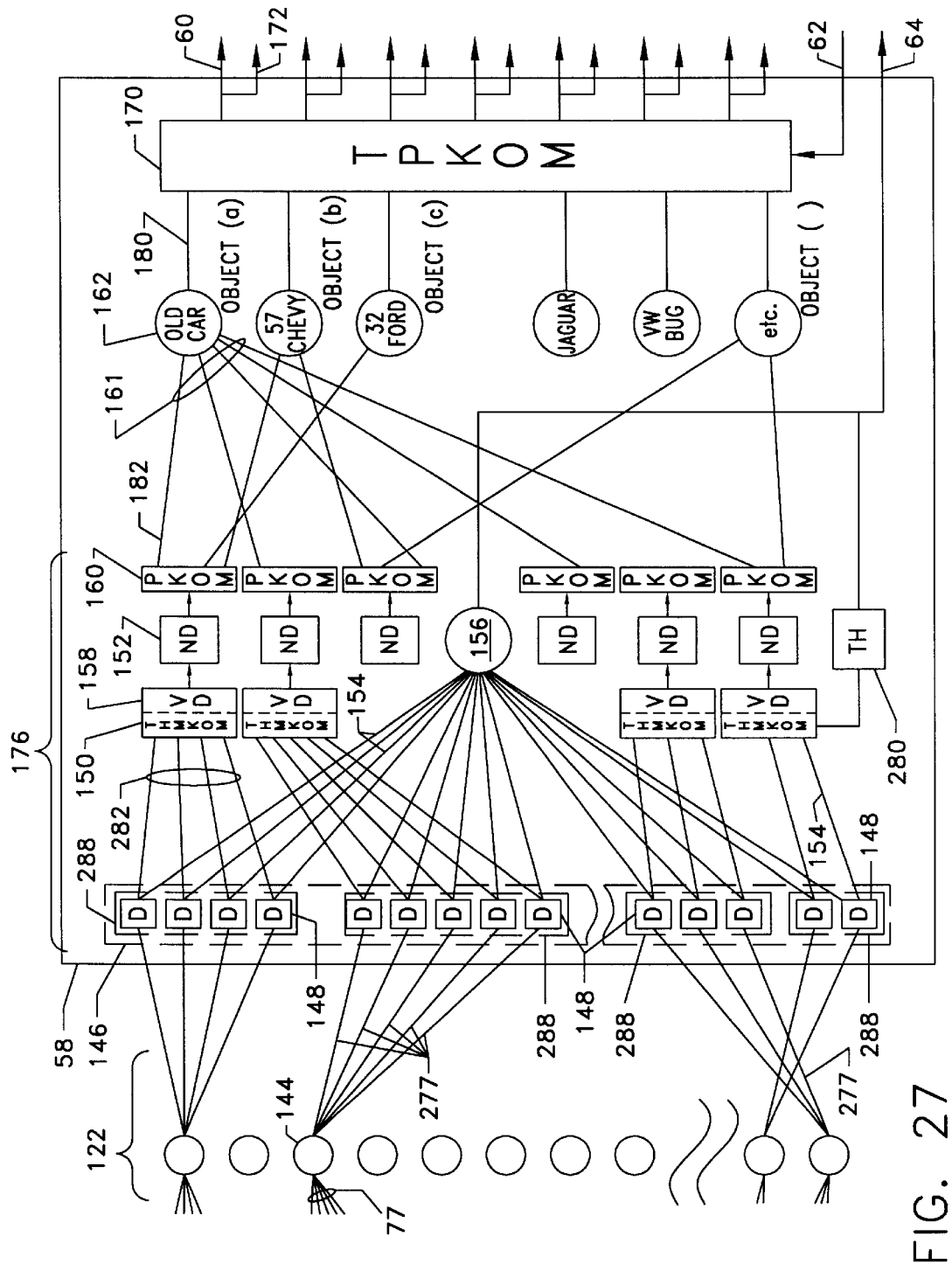
FIG. 27 is a detailed diagrammatic representations of the temporal component vectors and portions of a spatial recognition vector array of FIG. 1.

There is provided one spatial recognition vector array module 58 for each output class in the preferred embodiment of the invention. The temporal activations 54a, input to a spatial recognition delay vector 288, are on the order of the narrow output impulse of the matched filter 96 of the chaotic oscillator 65. The temporal activations 54a at the temporal component object recognition vectors 122 are similar to the signals shown in FIG. 21. A set of simple delays, or a delay vector 288, is matched to the timing of the temporal activations 54a that represent component objects in a specific spatial configuration The output signals 154 of all delay vector elements 148 are synchronized once per temporal activation period of signal 54a, both in the individual connections to a prototype neuron 156 and in each input vector 282 and THMKOM 150. All simple delays become the spatial recognition DVA 146 of which the output signals 154 are summed by the prototype neuron 156 (FIG. 27). Neuron 156 contains a dynamic threshold high enough to inhibit noisy delays and to pass the highest input power sum value to its output 64. Each set of spatial delay vectors 282 also drives feature limiting THMKOM 150, a vector decoupling module 158 and super object neural director 152.

The spatial recognition vector array 58 receives outputs from various temporal component object recognition vector output neurons 144 that are associated with the class of array 58. Each neuron 144 outputs a train of pulses similar to those shown in FIG. 21. One output neuron 144 contains a specific pulse train similar to one of the example pulse trains in FIG. 21. The pulse train contains a group of repeating pulses of different amplitudes such as t(a) through t(j), which input into a delay vector 288. The delay values (previously learned) of the delay vector 288 are such that the repeating pulses are temporally aligned to produce a simultaneous pulse output 282 of each delay vector 288, once in each temporal period of signal 54a. The simultaneous pulse output 282 of a delay vector 288 is composed of signals 154, which have elements that contain values equal to the varying pulse train amplitudes, thereby producing a momentary multidimensional vector, which contains a direction in space, used for recognition of a super object. The delayed signals 282 have a threshold applied by TH 280 to inhibit a hold operation for all gated values less than the threshold value, and the remaining signals 282 are then gated and held by THMKOM 150 and decoupled by VD modules 158. The resulting signal vector is an input to a super object neural director 152 to increase the vector's resolution. The highest element of the vector, which represents both the vector's general direction in its output space and a recognition of a learned super object, is produced as an output 182 of a PKOM 160.

The outputs of the array of PKOMs 160 are all connected through associative connections 182 to super object neurons 162. If the external associative connection 62 is uninhibited so as to represent, e.g., an interest in an old car, then the activation from the super object neuron for the old car, represented by 162 object(a), passes through the enabled TPKOM 170, which operates in a manner similar to TPKOM 126 (FIG. 25). The old car PKOM data 161, i.e., the collection of associative connections 182 to old car neuron 162 object(a), is thereby passed from the held vector to activate neuron 162 object(a) and the old car output activation 60. It is noted that the normal signal for the external associative connection 62 of interest is an inhibit signal applied to each spatial recognition vector array 58. This architecture reduces the burden of extraneous neural information and neural activation processing in all spatial recognition vector arrays 58, thus an activation of interest is an uninhibit signal. The inhibit/uninhibit signal can be a controlling input signal to a threshold device in that a high threshold would inhibit all signal passage, while the at least one uninhibit (or the removal of the inhibit) will allow the threshold device to operate in a normal mode. It is also noted that the architecture from the PKOM 160 array through connections 182 and neurons 162 is similar to a memory vector space, an active memory vector and a recognition vector architecture. Each car super object is processed as described above. Other super object classes, other than cars, are represented in other instances of a spatial recognition vector array 58.

In the example where the input image 42 is an old car and the external associative connection 62 is uninhibited to provide an activation of a "transportation" need, or an equivalent, the inhibit signal will allow TPKOM 170 to pass old car activations at neuron 162 object(a), to become the attentive object representation 60, as shown in FIG. 1. TPKOM 170, shown in FIG. 27, only allows one super object activation 180 to become the attentive object representation 60.

Figure 3:
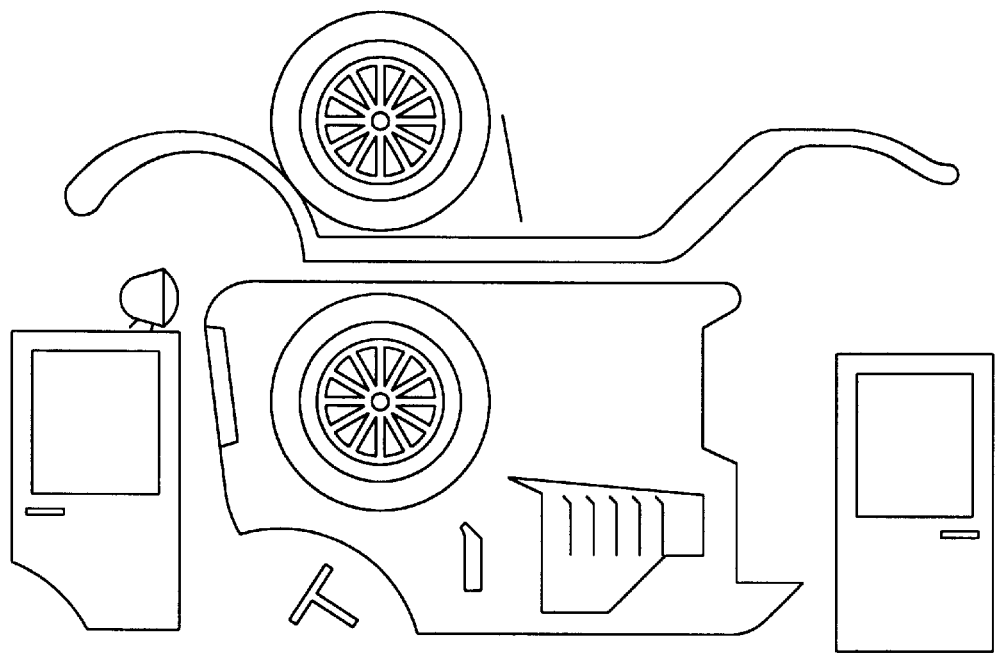
FIG. 3 is a side elevational view, similar to FIG. 2, but showing the identical car components in a different arrangement.

A second scenario is allowed when a car input image 42 is foveated and no interest or associative activation 62 is active, i.e., the signal remains inhibited. Then the only output of a spatial recognition vector module 58 is the prototype object activation 64. A third scenario is allowed if no object activation 64 exists, then the input image 42 contains no known class object. A fourth scenario is allowed when the pile of old junk of FIG. 3 is the input image 42. The spatial configuration of the component objects is not correct to represent a car and only the peripheral vision object activations 66 (FIG. 11) will be active. Also, the temporal signal 54a will not contain a recognizable spatial configuration representing a car. Thus the spatial recognition vector array 58 will not contain an output signal.

As with the component recognition vectors 49 of FIG. 10, a temporal component recognition vector 122 (FIG. 26) contains a neuron 144. Each neuron 144 activates the passage of a temporal signal 54a through the neuron 144 to the DVA 146 of the spatial recognition vector array 58. Temporal component object recognition vector 122 includes connections 277 to provide inputs to a group of delay elements 148 of delay vector 288. Thus, a combination of a neuron 144 and a group of recognition connections 277 comprise a temporal component object recognition vector 122 (FIG. 27). The active memory element 110a is shown as a single active element in FIG. 26 to simplify the drawing and to illustrate the concept of the temporal memory vector 51. Each active memory element 110a is in reality a group of individual activities of SUMs 89. The temporal component recognition vectors 122 each have an input for a common threshold 184 to each neuron 144. The purpose of the threshold is to inhibit minor activations of the temporal component recognition vectors 122.

In addition to the old car attentive object representation 60 (FIGS. 1 and 27), the super object output representation of TPKOM 170 is also connected through its associative connections feedback 172 to the component object chaotic oscillators 65 of the component recognition vectors assembly 48 (FIG. 11). Here the association connections become a synchronizing feedback signal 172 and increase the output amplitude of the temporal activations 50b. The increase of the temporal activations 50b then further increases the attention gain in the LGN module 45 only for the component object neurons that constitute the old car pixel data. The associative connection feedback signal 172 maintains a "phase lock" on each chaotic oscillator 65 by repetitively resetting its internal condition.

When the chaotic oscillator 65 is gated on, it is started in an initial condition that is identical to the internal conditions that exist in the chaotic oscillator just after a synchronization activation. These conditions of synchronization produce a temporal activation sequence of all relative component objects that can be recognized by the spatial recognition delay vector array 146. At this point in the architecture, only the old car object in FIG. 2 will activate the old car super object neuron 162 object(a) and the attentive object representation 60 in FIGS. 1 and 27. The resolving ability of the prototype neuron 156 (FIG. 27) is low because the simple summations of the aligned temporal activations carry a representation of a generalized correct component configuration. The super object, with its relative attentive object representation 60, has a high resolving ability because its super object neural director 152 has a higher sensitivity to slight variations in the component spacing. The example prototype output only represents a car, while the super object represents the type of car. The initial training of the various neural network modules for a super object classification bring the chaotic oscillators 65 of spatial image processor 10 into a correct synchronization, and the spatial recognition delay vector array 146 into a correct temporal alignment.

Synchronization of the chaotic oscillators 65 is performed by a characteristic of the feedback signal 172. As previously described above, the temporal signal 54a is converted from a serial train of information to that of a momentary multidimensional vector which is held as an input signal in the THMKOM 150 for a time less than the repeatable period of signal 54a. When the hold time of the multidimensional vector is completed the input signal in the THMKOM 150 becomes a vector of zero. The zero vector affects both signal 60 and feedback signal 172 as a "drop out" that is used to synchronize only the chaotic oscillators 65 providing temporal activations for the recognized super object class 60.

The spatial image processor 10 shown and described herein requires two training phases that occur under a single application of a new super object to be learned, as long as all component objects were previously learned. The first phase is a chaotic adaptive resonant learning of the spatial recognition delay vector array 146 under an instance only when it is the first to be learned in its class. The second phase is the learning for the initial condition activation of the chaotic oscillators 65 which forces each related component chaotic oscillator 65 into a closer "synchrony" with each other. The low level component recognition vector array 49 and temporal component recognition vector array 122 must be independently learned from the new object to be learned.

To train a low level component object, its input image 42 can be placed anywhere on the input array 40 to produce a component memory vector 63 (FIG. 10) and a temporal memory vector 51 (FIG. 26) in their respective output space 59, 140. To train a temporal component object recognition vector in array 49, a set of normalized value connections 77 are placed between an unlearned output neuron 74a in the array of temporal component recognition vectors 122 and each element of its active temporal component memory vector 51.

The component recognition vector connections 79 (FIG. 10) are also trained as indicated above, except that a set of normalized component recognition bi-directional connections 79 are connected between an unused neuron 174 of component object recognition module 48 and each element of the memory vector 63 while the low level component object input image 42 is applied A component recognition vector neuron 67 allows an active recognition signal to feedforward along one path to enable a chaotic oscillator 65 and a feedback signal to back track parallel along the same path as the active signal. The feedforward active signal enables the feedback path at each neural junction.

The temporal activations of a chaotic oscillator 65 (FIGS. 11 and 11A) are initialized during a low level component training of a component recognition vector 49 and connections. The matched filters 96 of each uninitiated chaotic oscillator 65 have random matched filter connections and have a random activation pattern to be the chaotic oscillator's "initial condition". A set of initial conditions is defined as variables/potentials assigned to each neuron and delay line cells where the initial conditions are values equivalent to a free running nonlinear chaotic oscillator frozen in an instant of time. At the time a chaotic oscillator 65 is initially activated by its component recognition vector 49, the matched filter 96 senses its highest output activation over the sequence of patterns and when an identical activation occurs for the second time, the matched filter 96 assumes connection values equal to the chaotic oscillator's activation pattern of nonlinear neurons 96a of matched filter 96. A matched filter 96 is similar to the initial conditions and is defined as containing connection values from an instant in time of neuron values where each connection assumes its neuron's activation value at said instant of time. The training of each low level component object is processed as above.

The training of a new attentive object class is usually accomplished by using a basic form of the object containing all essential components because the first object also approximates the prototype class, but it is not required for it to be a basic form. Special initial conditions are required for a new attentive object class for the spatial recognition vector array 58 of FIG. 27. Assuming an example of an old car as the training image 42, these initial conditions are:

(1) The neuron 156 operates at a low threshold;
(2) There are no temporal component recognition vector output connections 277 to the spatial recognition delay vector array 146;
(3) Each untrained delay vector element 148 is set for a random delay;
(4) "Prewired assemblies" 176 of grouped delays 288, THMKOM 150, VD 158, super object ND 152 and PKOM 160 modules exist as a set of independent modules with a priori unit connections between each modules;
(5) Each delay output signal 154 is connected to neuron 156 with a unit value connection;
(6) The super object old car neuron 162 object(a) input connections 182/161 do not exist;
(7) The associated feedback connection 172 does not exist;
(8) The external class associative connection 62 is uninhibited because the object to learn is an object of interest;
(9) All remaining connections are as represented in the spatial recognition vector module 58;
(10) Th module 280 has a temporary training connection (not shown) to object (a) neuron 162; and
(11) A new attentive object to be learned places its input image on the input array 40.

In the first phase of training, the various component object recognition vectors 49 activate their chaotic oscillators 65 and matched filters 96 to produce a sequence of temporal data 104, similar to one of the impulses per period shown in FIG. 15. Temporal data 104 returns along the feedback path through retina 52 and memory processor 56 to the temporal component recognition vectors 122, as previously described. Upon a Hebbian-like activation, each one of the active temporal component recognition vectors 122 becomes directly connected by unit connections 277 to a delay vector 288 in the DVA array 146, as neural module 58 is active for learning, and immediately neuron 156 becomes activated with temporal pulses from signal 54a. Each chaotic oscillator 65 is similar to each other but contains random initial condition starting values and different immediate activation patterns. Thus they have similar repeated pattern periods, which generate varied temporal signals that produce repeated varied rising of power summations in neuron 156 caused by the initial random delays and the input chaotic temporal activations. Each time the neuron 156 senses a maximum peak in summation, it produces a momentary output 64 and readjusts its threshold to its new peak in a period of 54a. In this training mode only, and upon the first repeated maximum peak of neuron 156, the TH module 280 learns an approximation of the timing period for an end of the hold time and provides a synchronizing "drop out" as discussed below. As a function of the changing output sequences from neuron 156, while the hold timing stabilizes through neuron 156, the TH module 280 provides a "drop out" simulation to TPKOM 170 previously enabled by the external connection 62. The "drop out" occurs between the hold time and a period of signal 54a. Also, upon the initial synchronizing "drop out" activity, the activations between the TPKOM 170 output and the associative active component chaotic oscillators 65 generate Hebbian associative feedback unit connections 172 between the TPKOM active output 170 and each active chaotic oscillator 65. Upon the generation of the feedback connections 172, each time neuron 162 is at a peak, the TH module 280 momentarily "drops out" its activity and the TPKOM output synchronizes the oscillators 65 by resetting the oscillators' initial conditions. The temporal activations at the spatial recognition delay vector array 146 (FIG. 27) start to repeat in a deterministic fashion. The individual delays are further adjusted in time to increase the output of neuron 156. When the delay error and the TH module 280 hold time error both approach an acceptable minimum, without a duplication in delay values in any one of the group of delay vectors 288, the training is halted for that assembly. As the output 64 of 156 increases during this training, so does its threshold to insure that only one peak output is convergent. When the delays for all assemblies are convergent and their output activations correlate through to PKOM 160, the old car super object normalized input connections 161 are generated. Thus each of the concurrent active PKOM 160 has one output (FIG. 27) for the object learned and activates the super object old car neuron 162 object(a). At the same instant of time, the training connection from TH module 280 is removed. If required, training is continued to further optimize the delays and hold values.

The object trained now becomes the prototype object, becomes the first super object (a) neuron and becomes the attentive object representation 60. The sequence of the first phase is complete and training continues into the second phase without stopping if it is found to be required.

In the second phase, the chaotic oscillator's exact activation pattern is noted at the instant of the matched temporal data 104 output activation and is used to rematch the connections of network matched filters 96. The reason for a rematching is that a synchronized chaotic oscillator near its initial condition actuation alters its patterns slightly from that of its initial free running mode and that the best match of the random connections 96 may not be exact. The chaotic oscillator's matched filter 96 is rematched at the time when its peak activation occurs by resetting the matched filter connection values equal to the chaotic oscillator's exact activation patterns and resetting the matched filter 96 threshold to a value relative to its new matched output value. This does not alter the timing of the chaotic oscillator 65. The above training phases allow an "immediate" (within one cycle) spatial recognition of a super object of interest when its input image is instantly presented on the input array 40. Other super object neurons 162 of the same class are trained by repeating the application of a new normalized connection set 161 from the active PKOM 160 outputs 182 to the new super object neuron 162. A new class of super objects requires another spatial recognition vector array 58 and training of its component recognition vectors 49, then a repeat of the two phases.

There is thus provided a spatial image processor 10 that is capable of discriminating between two groups comprised of identical components in two different spatial configurations. The spatial image processor 10 increases its sensitivity or attenuation to an object of interest in a field of more than one object and invariantly recognizes an object in retina translations. The processor recognizes a partially hidden object when the object is incomplete or split, and also recognizes one object in a field of many different objects and/or of different object sizes.

The description of the spatial image processor 10 has been presented using component objects in a spatial configuration of a super object. The component objects do not have to be as complex as used in the examples herein. They can be of a lower set of basic geometric shapes or primitives (a set of the smallest and discernible parts of a visual scene) out of which any super object can be constructed.

The sensitivity of the spatial image processor 10 invention can be improved or simplified by interchanging the PMKOM, MKOM, PKOM, and KOM with or without thresholds and/or with other constructed neural network modules depending upon the design and/or purpose of the embodiment for the invention. These changes may increase the efficiency of the attentive super object and at the same time affect "non attentive" component objects to be reduced below the applied thresholds, thereby being eliminated from all recognitions as their effective contrasts are zeroed.

Figure 28:
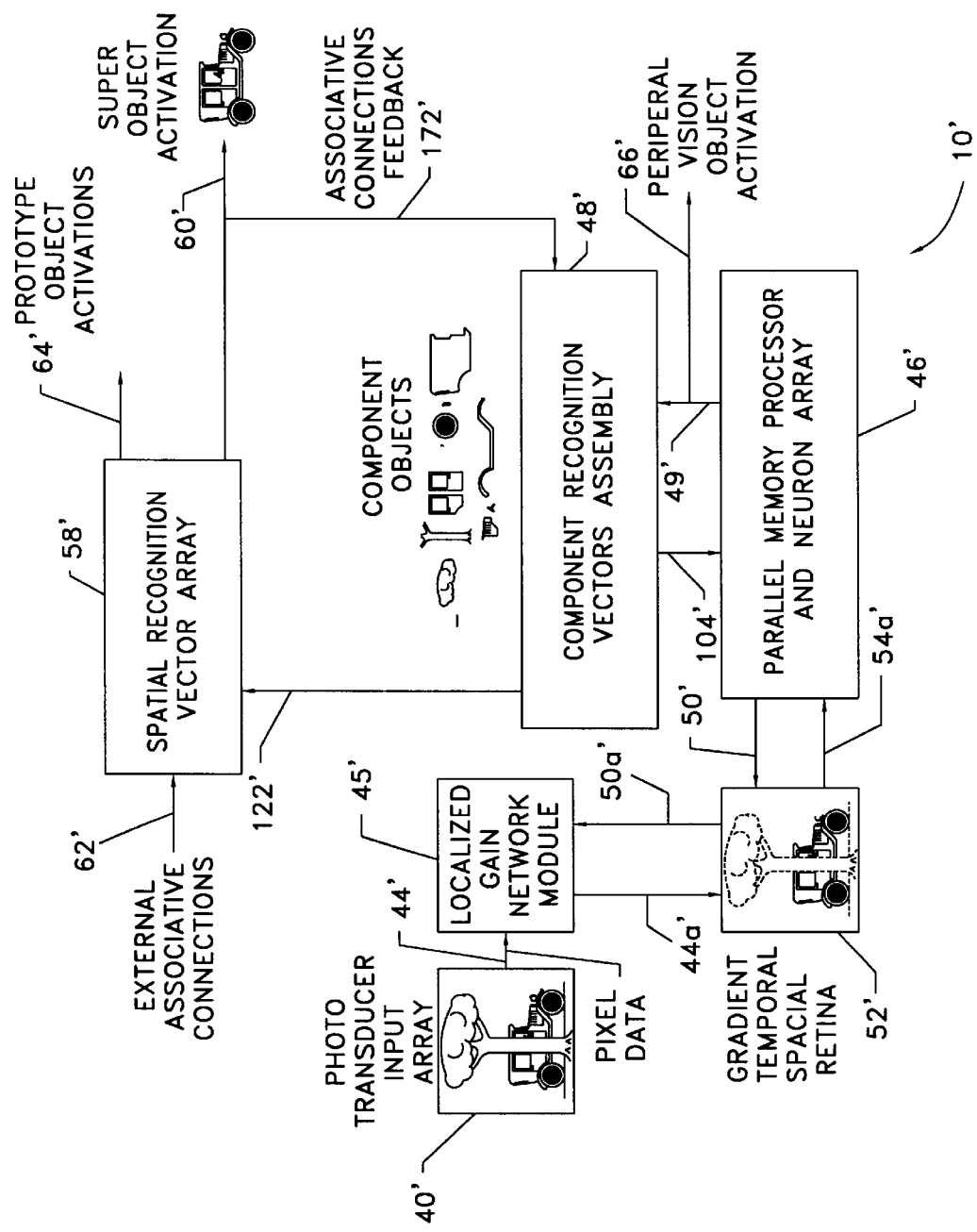
FIGS. 28–30 are diagrammatic representations of an alternate embodiment of the spatial image processor and its components.
Figure 29:
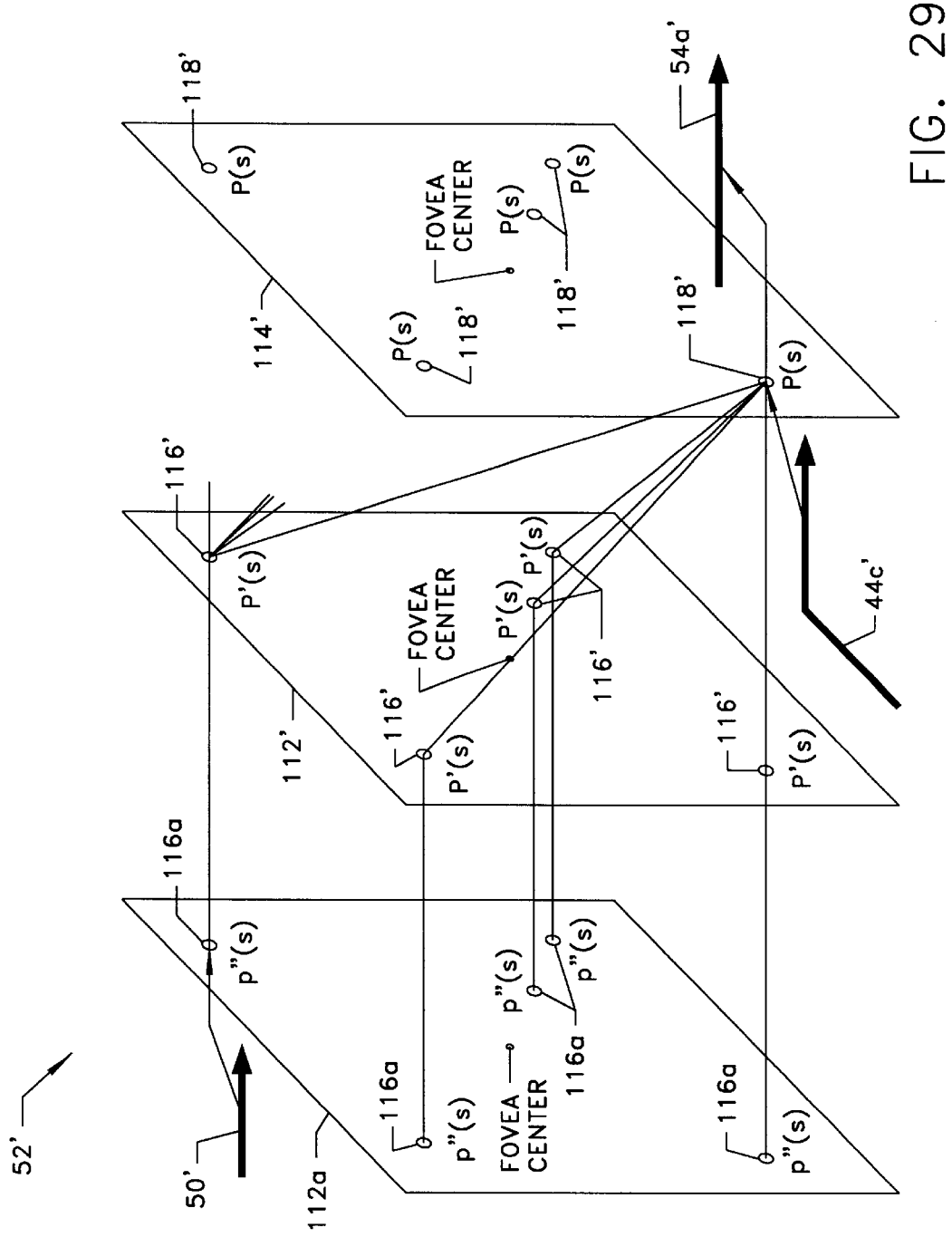
Figure 30:
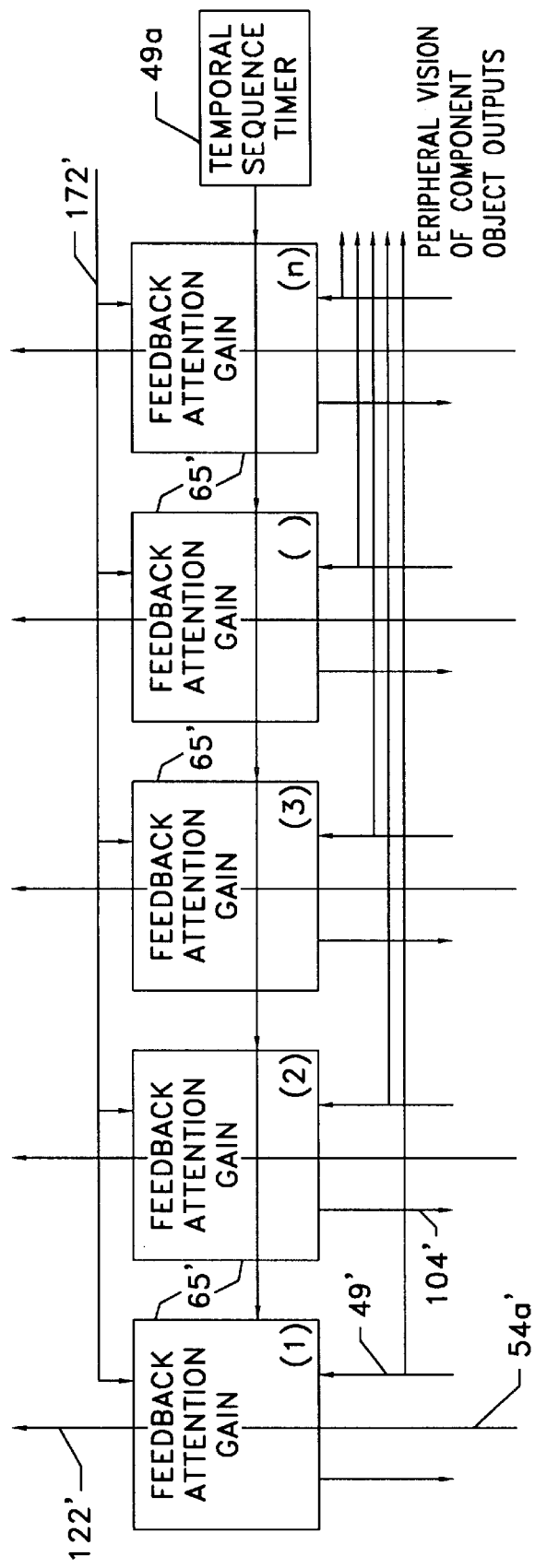

Referring now to FIGS. 28–30, a second embodiment of the spatial image processor is shown as 10'. As in FIG. 1, FIG. 28 shows the overall architecture of spatial image processor 10'. In comparison with FIG. 1, spatial image processor 10' combines the two memory processors 46 and 56 of the first embodiment into a single memory processor 46'. Memory processor 46' is configured in the same manner as processors 46 and 56 of the first embodiment, including the complex neurons as described previously for the first embodiment. The complex neurons of processor 46' enable the feedback signal back to the retina, enable the spatial temporal signal forward for super object recognition through the same path as the pixel data and process the pixel signal forward for component recognition. The "image signal" and/or its derivatives pass three times through the memory processor 46' and component recognition vectors assembly 48'.

Three signals, 44', 50' and 54a', will be used to describe the signal paths through spatial image processor 10'. These signals correspond to signals 44, 50 and 54a, respectively, of signal processor 10 of FIG. 1. Standard pixel data 44' travels through LGN 45' to the component object recognition vectors and activates one or more generators 65' from a component temporal generator array (FIG. 30) within component recognition vectors assembly 48'. It can be seen that the component temporal generators 65' correspond to chaotic oscillators 65 of FIG. 11. A generator 65' becomes active and applies a sequential pulse as a source for the temporal signal 50'. Each active component recognition vector 49' gates its temporal activation at a specific time within a cycle of repeat temporal activations, as controlled by temporal sequence timer 49a. Signal 50' follows the feedback path, enabled by signal 44', back to gradient temporal spatial retina 52' and LGN 45'.

Temporal signal 50' (as signal 50a') causes LGN 45' attention and retina spatial distributions as described in relation to LGN 45 of FIGS. 1 and 5, providing signal 44a' to gradient temporal retina 52'. (In the embodiment of FIG. 1, corresponding signal 44a of LGN 45 is provided to memory processor 46 as signal 44b and to retina 52 as signal 44c.) The gradient temporal retina 52' (FIG. 29) operates generally in the manner of retina 52. However, instead of signal 50' (corresponding to signal 50b of FIG. 12) activating neurons in the temporal retina 112', signal 50' has a gradient applied to it at gradient retina 112a. The activations from signal 50' through gradient retina 112a to temporal retina 112' are different in amplitude depending upon how far from the fovea center the activated neurons 116a are. Thus, the gradient temporal retina 52' must sense the image to be recognized at its fovea center, i.e., the new attentive object to be learned is foveated by placing the centroid of its input image at the center of the input array 40'.

The temporal and spatial retinas 112' and 114' operate in the manner described for retinas 112 and 114, respectively, to provide signal 54a'. The temporal spatial signals 54a' are now combined with the pixel data 44' and, being enabled at each neuron, ride through the positive path of signal 44' to the component temporal generators 65' of component recognition vectors assembly 48'. The component recognition vectors assembly 48' has two outputs. The first is the output 104' of component temporal generators 65' for signal 44' that enables signal 50' as described previously. The second is the output 122' that enables signal 54a'. It is seen from FIG. 30, that output 122' results from recognition vectors 49' combined with signal 54a' merely passing through assembly 48'. By merely passing through assembly 48', the path for signal 54a' from gradient temporal retina 52', through processor 46' and assembly 48' is analogous to the path for signal 54a from retina 52 through processor 56 in the first embodiment of FIG. 1. Output 122' feeds the super object and temporal array 58' to produce attentive object representation 60', prototype object activations 64' and associative connections feedback 172', in a manner similar to that described for array 58, representation 60, activations 64 and feedback 172, respectively, of FIG. 1. While the super object and temporal array 58' is similar to spatial recognition vector array 58 of FIG. 1, array 58' extends the external inhibit/activate signal 62' to its TH module to further reduce unnecessary signal processings as discussed for TPKOM 170 of FIG. 27.

Thus, it is seen that the spatial image processor of either embodiment senses the relative Euclidean spacing of component objects that make up a super object's virtual image, so as to recognize the super object and its classification without regard to the image size. The information of the relative Euclidean spacings of the component object images is carried with each temporal component object activation. Therefore, a partial obstruction of the super object image does not impede the recognition of the super object as the remaining visible component objects will carry correct and recognizable geometric configuration information. The component objects of a super object, in a different spatial configuration from that learned, are discriminated from recognition by their spatial orientations. The spatial image processor uses a low level attention feedback from each recognized component object in an input scene to enhance the sensitivity of each known component object signal path and to reduce the unimportant parts of the scene. If there exists an interest (external input) in a super object in the scene, then a higher level feedback attention further enhances the processed signal carrying the super object and reduces all other processed signals in the input scene.

What is claimed is:

1. A spatial image processor neural network for processing an image so as to recognize a whole object from rearranged and partial configurations of component objects, each component object forming a part of the whole object, said network comprising:

a photo transducer input array for converting the image to pixel data and sending signals indicative of the pixel data;

a localized gain network module for receiving the signals indicative of the pixel data, increasing the gain of said pixel data in response to attention activations received by said module and outputting localized pixel data;

a parallel memory processor and neuron array for receiving the localized pixel data from said localized gain network module, for processing the localized pixel data into component recognition vectors and peripheral vision object activations;

a component recognition vectors assembly for receiving said component recognition vectors, for receiving associative connections feedback, for generating temporal activations, and for sending feedback data to said parallel memory processor and neuron array;

a temporal spatial retina for receiving the localized pixel data from said localized gain network module and said temporal activations from said component recognition vectors assembly, for generating temporal spatial vectors and for sending signals indicative of said temporal activations;

a temporal parallel memory processor for receiving said temporal spatial vectors from said temporal spatial retina and for generating temporal component recognition vectors; and a temporal, spatial and object recognition vector array for receiving said temporal component recognition vectors from said temporal parallel memory processor, for forming attention activations to the whole object, for sending prototype object activations of a class of objects to which the whole object belongs, and for sending said associative connections feedback to said component recognition vectors assembly for the component objects recognized as forming a part of the whole object.

2. The network in accordance with claim 1, wherein, in said component recognition vectors assembly, each component recognition vector is operable to activate a chaotic oscillator, each of said chaotic oscillators being different, each to represent one of the component objects.

3. The network in accordance with claim 2, wherein each of said chaotic oscillators includes a matched filter and an initial condition which provides an input of synchronizing values and a matched output from each of said oscillators, which matched output provides said feedback data flowing from said component recognition vectors assembly to said parallel memory processor and neuron array.

4. The network in accordance with claim 1, wherein said component recognition vectors assembly is adapted for sequential generation of said temporal activations.

5. The network in accordance with claim 4, wherein said temporal, spatial and object recognition vector array further comprises:

a delay vector array receiving the temporal component recognition vectors and aligning a period of temporal activations of the temporal component recognition vectors to generate synchronized vector outputs;

a plurality of synchronized processing units, each receiving a synchronized vector output from an associated one of the delay vectors in the delay vector array and providing recognition connections;

a plurality of super object neurons, one of the super object neuron being activated when at least one recognition connection is made to the one super object neuron from one of the synchronized processing units, each activated super object neuron providing an object output;

a threshold unit receiving each object output and generating the attention activations to the whole object and the associated connections feedback; and a prototype classification neuron receiving and summing the synchronized vector outputs to generate the prototype object activations.

6. The network in accordance with claim 5, wherein each said synchronized processing unit further comprises:

a threshold and hold multi-king-of-the-mountain (THMKOM) unit receiving, gating and holding the synchronized vector output from the associated delay vector;

a vector decoupler to decouple the gated and held synchronized vector;

a neural director receiving the decoupled synchronized vector to increase a resolution of the decoupled synchronized vector; and a positional king-of-the-mountain (PKOM) unit receiving the increased resolution vector to generate a highest element of the increased resolution vector representing the recognition connection of the whole object.

7. The network in accordance with claim 6, wherein said temporal, spatial and object recognition vector array further comprises a threshold and hold module applying a threshold to the synchronized vector outputs of the delay vector array.

8. The network in accordance with claim 1, wherein said localized gain network module includes a vector normalizer for adjusting the received image pixel data into a normalized vector of said image pixel data.

9. The network in accordance with claim 8, wherein said parallel memory processor and neuron array further comprises an image position and size invariant retina generating feature vectors from which are developed said component recognition vectors and said peripheral vision object activations.

10. The network in accordance with claim 9, wherein said parallel memory processor and neuron array further comprises:

multi-layer neural directors receiving said feature vectors; and feedback and threshold positional king of mountain (FTPKOM) units, each unit receiving a neural director output from an associated one of the multi-layer neural directors, and each unit generating a FTPKOM output.

11. The network in accordance with claim 10, wherein parallel memory processor and neuron array further comprises:

SUM neurons, each SUM neuron receiving the FTPKOM output from an associated one of the FTPKOM units, each SUM neuron being operative to provide a SUM output;

a component memory vector space receiving said SUM outputs and forming connection sets based on activations in the memory vector space elicited by said SUM outputs; and a neuron array, which, together with the connection sets, forms the component recognition vectors.

12. The network in accordance with claim 9, wherein the image position and size invariant retina further comprises:

a window difference neural network (WDN);

a vector decoupler (VD); and a gradient window, the WDN forming differences from a reference pixel to all other pixels in the gradient window, said VD being operative to decouple and disperse said differences to provide said feature vectors.

13. The network in accordance with claim 1, wherein said temporal spatial retina is provided with a temporal retina and a spatial retina cooperating to provide said temporal spatial vectors directed to said temporal parallel memory processor.

14. The network in accordance with claim 1, wherein said temporal parallel memory processor further comprises a temporal image position and size invariant retina receiving said temporal spatial vectors and generating temporal feature vectors.

15. The network in accordance with claim 14, wherein said temporal parallel memory processor further comprises:

temporal multi-layer neural directors receiving said feature vectors and generating temporal neural director outputs; and threshold positional king-of-the-mountain (TPKOM) units, each receiving the neural director output from an associated neural director and each generating a TPKOM output.

16. The network in accordance with claim 15, wherein said temporal parallel memory processor further comprises:

temporal SUM neurons, each receiving the TPKOM output from an associated TPKOM unit and providing a temporal SUM output;

a temporal component memory vector space receiving said temporal SUM outputs and forming temporal connection sets based on activations in the temporal component memory vector space elicited by said SUM outputs; and a temporal neuron array, which, together with the temporal connection sets, forms said temporal component recognition vectors.

17. The network in accordance with claim 1, wherein:

the parallel memory processor and neuron array and the temporal parallel memory processor are combined to form a single memory processor;

a gradient retina applies a gradient to the localized pixel data prior to the localized data being received by the temporal spatial retina, the gradient for each pixel corresponding to a distance between the pixel and a fovea center of the image; and each component recognition vector is operable to activate a component temporal generator of an array of component temporal generators in the component recognition vectors assembly, the activated component temporal generator applying a sequential pulse corresponding to said temporal activations.

* * * * *